United States Patent [19]

Haramaki et al.

[11] 4,433,905
[45] Feb. 28, 1984

[54] SHEET AND ORIGINAL FEEDING FOR IMAGE FORMING SYSTEM

[75] Inventors: Toshio Haramaki, Yokohama; Shigeru Nakayama, Kawasaki, both of Japan

[73] Assignee: Tokyo Shibaura Denki Kabushiki Kaisha, Kawasaki, Japan

[21] Appl. No.: 361,104

[22] Filed: Mar. 23, 1982

[30] Foreign Application Priority Data

Mar. 27, 1981 [JP] Japan .................................. 56-45202

[51] Int. Cl.³ ............................................. G03G 15/00
[52] U.S. Cl. ............................... 355/3 SH; 355/14 SH; 271/3.1; 271/212
[58] Field of Search ............. 355/14 SH, 14 R, 3 SH, 355/3 R; 271/173, 3.1, 4, 64, 288, 5, 94, 98, 212, 9

[56] References Cited

U.S. PATENT DOCUMENTS

| | | | |
|---|---|---|---|
| 4,050,805 | 9/1977 | Hage | 355/14 |
| 4,190,354 | 2/1980 | Smith et al. | 355/3 SH |
| 4,212,457 | 7/1980 | Guenther | 355/14 SH X |
| 4,218,128 | 8/1980 | Satomi et al. | 355/14 SH |
| 4,218,129 | 8/1980 | Ishimoto et al. | 355/14 SH |
| 4,264,187 | 4/1981 | Rhodes, Jr. | 355/14 SH |
| 4,272,180 | 6/1981 | Satomi et al. | 355/14 SH X |
| 4,368,973 | 1/1983 | Silverberg | 355/3 SH |

*Primary Examiner*—A. C. Prescott
*Attorney, Agent, or Firm*—Cushman, Darby & Cushman

[57] ABSTRACT

An image forming system comprises an image forming device having an exposure unit provided on the upside of a first body for exposing an original placed thereon, sheet feeding mechanism provided at one side of the first body and sheet exhausting mechanism provided at one side of the first body, and an original feeding device having a second body arranged on the exposure unit, an original inserting mechanism provided at one side of the second body in the same side of the one side of the first body and inserted with the original thereto, an original exhausting mechanism provided at the one side of the second body and exhausted with the copied original, and a conveying mechanism for conveying the inserted original to the exposure unit and conveying the original exposed thereat to the original exhausting mechanism.

12 Claims, 37 Drawing Figures

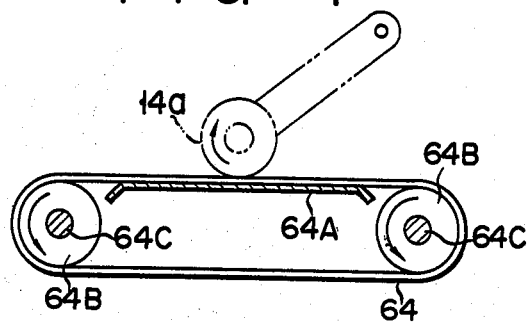
FIG. 7
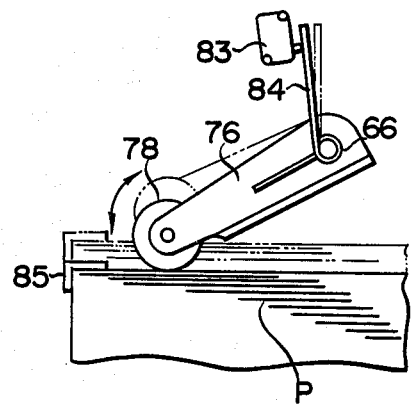
FIG. 8
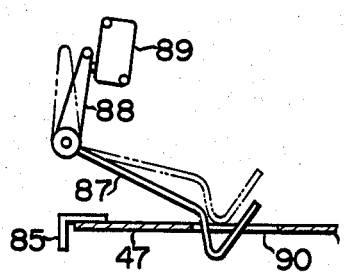
FIG. 9
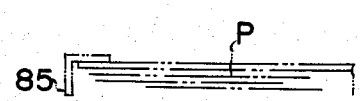
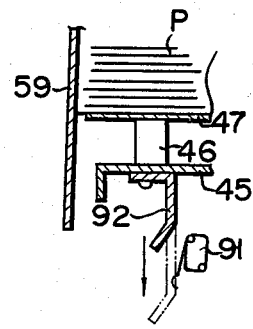
FIG. 10
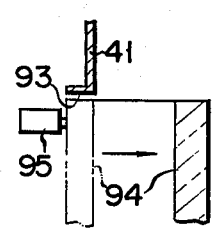
FIG. 11

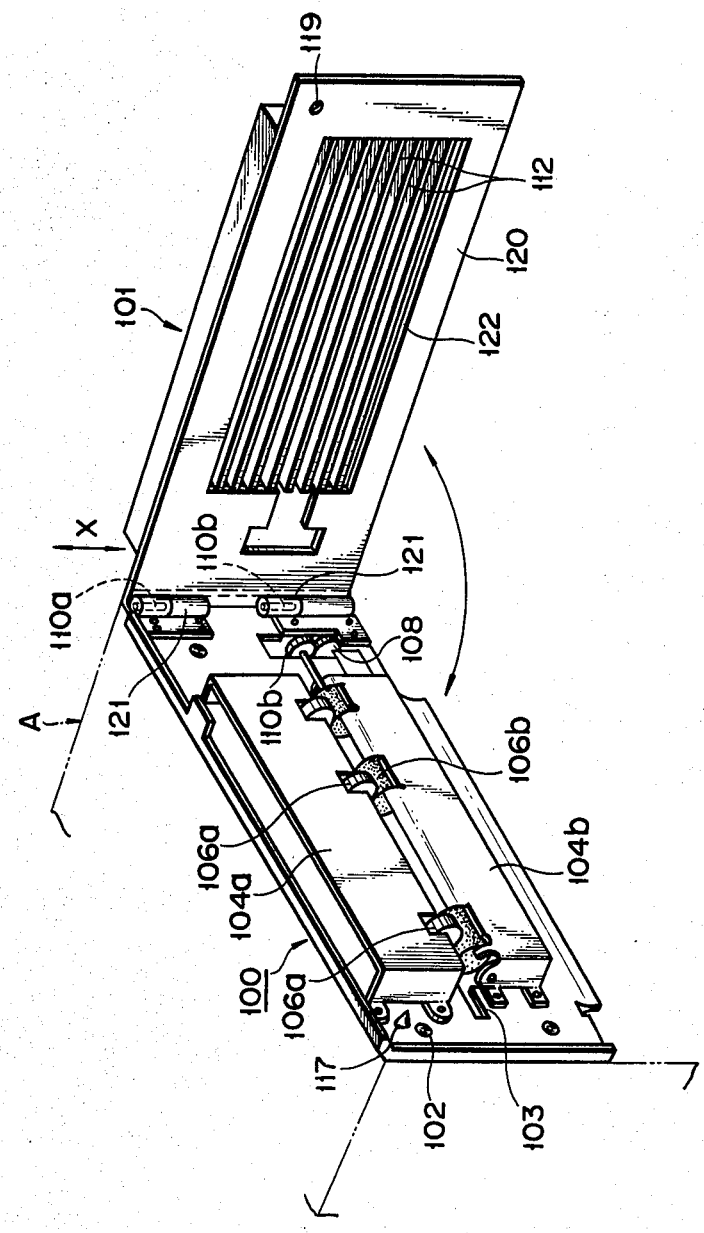

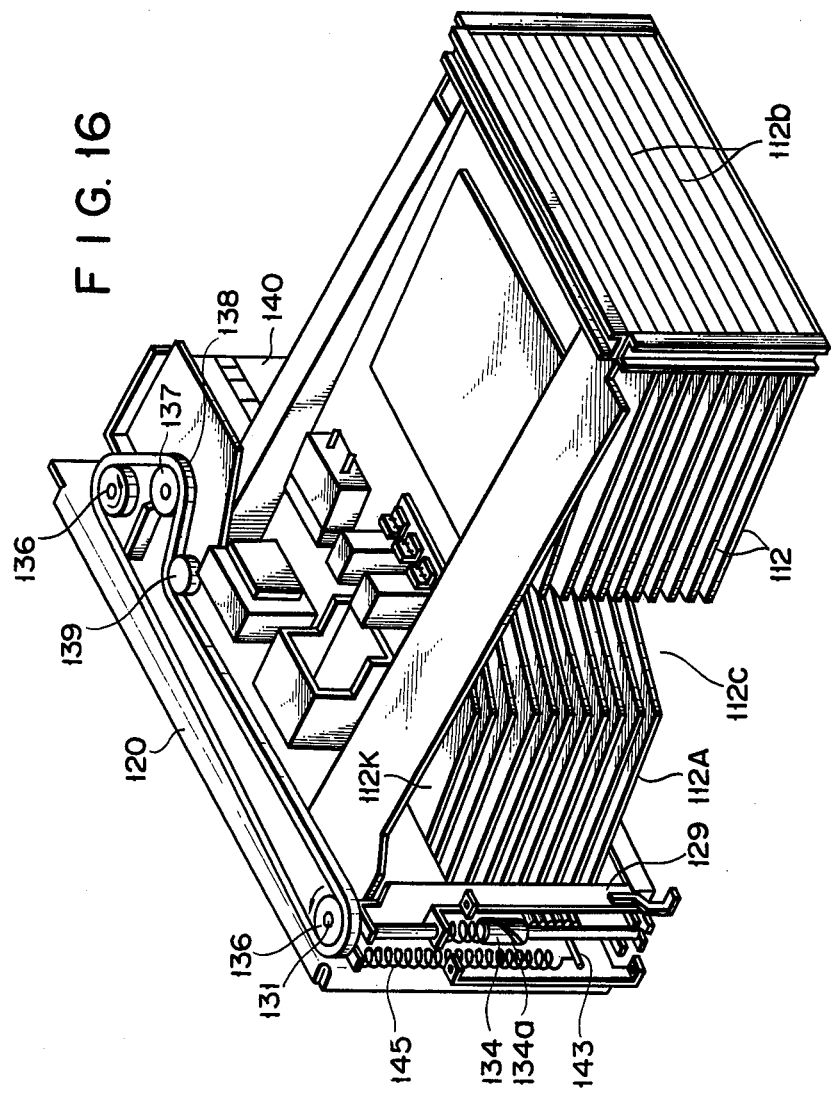
F I G. 16

SHEET AND ORIGINAL FEEDING FOR IMAGE FORMING SYSTEM

BACKGROUND OF THE INVENTION

This invention relates to an image forming system and, more particularly, to an image forming system which has an image forming device and an original feeding device provided on the exposure unit of the image forming device.

In a conventional image forming system which has an image forming device and an original feeding device provided on the exposure unit of the image forming device, an original is conveyed from one side to the other side in the original feeding device, and a copy sheet is conveyed from one side to the other side in the image forming device. The original is, for example, inserted from the right side of the original feeding device, and the exposed original is exhausted from the left side of the original feeding device. The copy sheet is fed from a feeder unit provided at the right side of the image forming device into the image forming device, the copied copy sheet is exhausted to a sorter unit provided at the left side of the image forming device. Thus, it is necessary for an operator to feed the original and the copy sheets with his right hand and to exhaust the original and the copied sheets with his left hand. Accordingly, the operator's both hands are occupied, and it is complicated to operate at the time of copying a plurality of originals. More particularly, the operator must pay attention to the right side of the respective devices at the time of inserting the original and feeding copy sheets and must also pay attention to the left side of the respective devices at the time of exhausting the copied sheets and exposed originals. In this manner, the conventional image forming system is very complicated in its operation.

SUMMARY OF THE INVENTION

A primary object of the present invention is to provide an image forming system which contemplates to eliminate the aforementioned drawbacks and disadvantages of the conventional image forming system and which can readily confirm the operations by concentrating the confirming objects to one side to improve the operability thereof.

According to an aspect of the present invention, there is provided an image forming system which comprises an image forming device having a first body, an exposure unit provided on the upside of the first body for exposing an original placed thereon, sheet feeding means provided at one side of the first body and sheet exhausting means provided at one side of the first body, said image forming device copying an image corresponding to the original on a copy sheet fed from the sheet feeding means and exhausting the copied sheet from the sheet exhausting means; and an original feeding device having a second body arranged on the exposure unit, an original inserting unit provided at one side of the second body in the same side of the one side of the first body and inserted with the original thereto, an original exhausting unit provided at the one side of the second body and exhausted with the copied original, and a conveying mechanism for conveying the inserted original to the exposure unit and conveying the original exposed thereat to the original exhausting unit.

BRIEF DESCRIPTION OF THE DRAWINGS

FIG. 7 is a view showing the relationship between a conveyor belt and a takeup roller;

FIG. 8 is a side view for the explanatory purpose of the operation of an upper limit switch;

FIG. 9 is a side view showing a sheet existence/absence detecting mechanism;

FIG. 10 is a side view for the explanatory purpose of the operation of a lower limit switch;

FIG. 11 is a side view for the explanatory purpose of the operation of a door opening/closing detecting switch;

FIGS. 14A and 14B are respectively plan and perspective views showing the containing member for the sorter unit in the opened state;

FIG. 16 is a perspective view showing the internal construction of the sorter unit;

DETAILED DESCRIPTION OF THE PREFERRED EMBODIMENT

Figure 1:
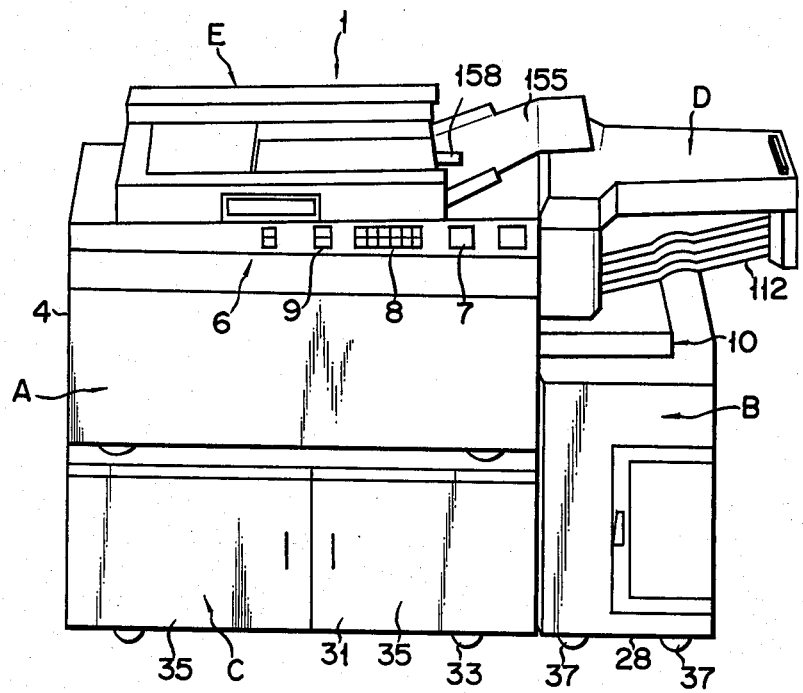
FIG. 1 is a perspective view showing one preferred embodiment of the image forming system according to the present invention.
Figure 2:
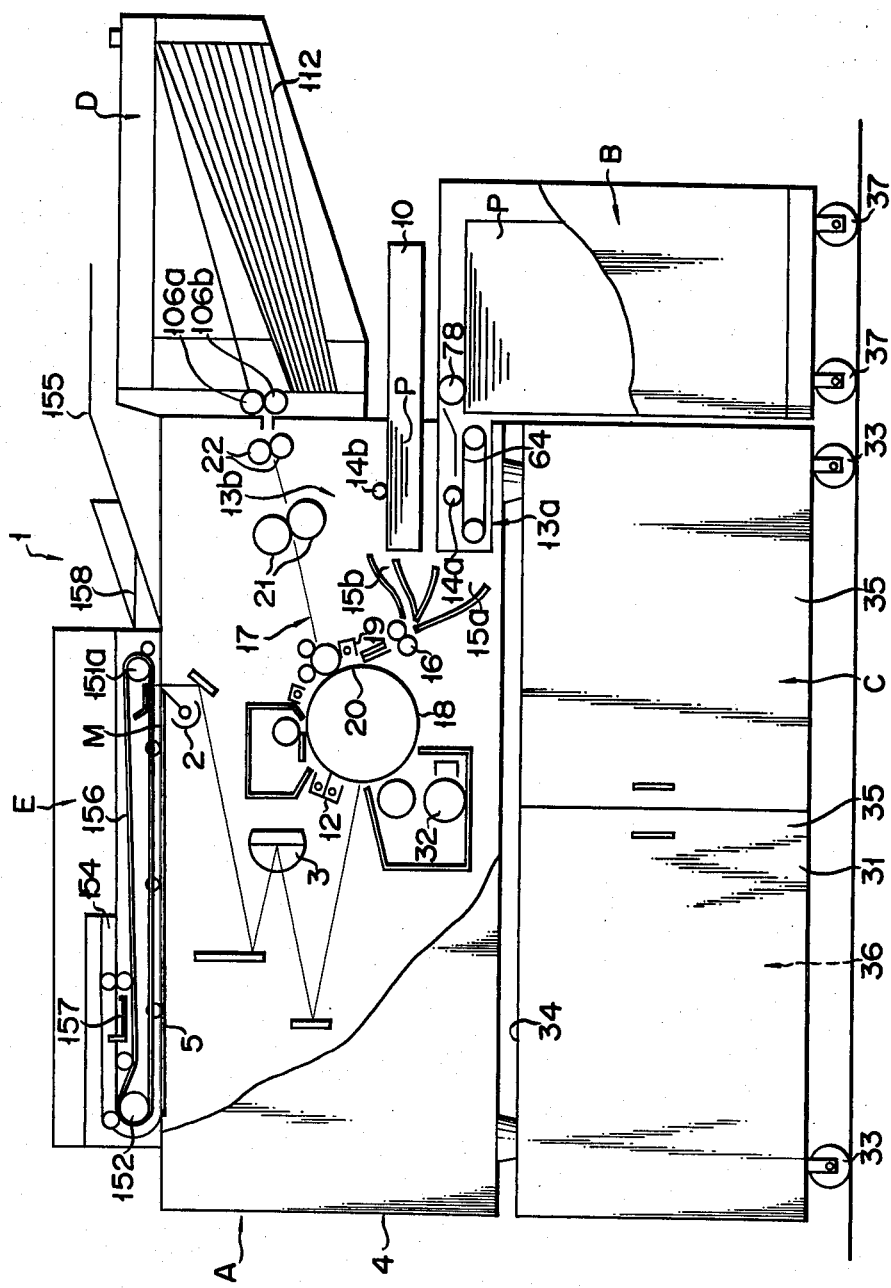
FIG. 2 is a sectional view showing schematically the cross section of the system shown in FIG. 1.

Reference is now made to the drawings and particularly to FIGS. 1 and 2, showing one preferred embodiment of the image forming system constructed according to the present invention.

In FIGS. 1 and 2, the image forming system 1 comprises a double cassette type electrostatic copying machine A as an image forming device, a feeder unit B mounted on the electronic coping machine A instead of one sheet feeding cassette when a number of sheets are required continuously in the electrostatic copying machine A, a platform C for carrying the electrostatic copying machine A, a sorter unit D provided at the copy sheet (P) exhausting unit of the electrostatic copying machine A for sequentially sorting and containing the copy sheets P to be exhausted in the respective bins, and an original feeding device E disposed on the exposure unit of the electrostatic copying machine A for automatically feeding the original.

The electrostatic copying machine A has a body 4; and an original placing unit 5, an operation panel 6, a copy switch 7, ten keys 8 for setting the number of sheets to be copied and an indicator 9 for indicating the number of sheets to be copied and various states provided on the body 4. A cassette 10 for containing sheets P and the feeder unit B are detachably mounted in upper and lower stages of the lower section of the right side face of the body 4.

Figure 3:
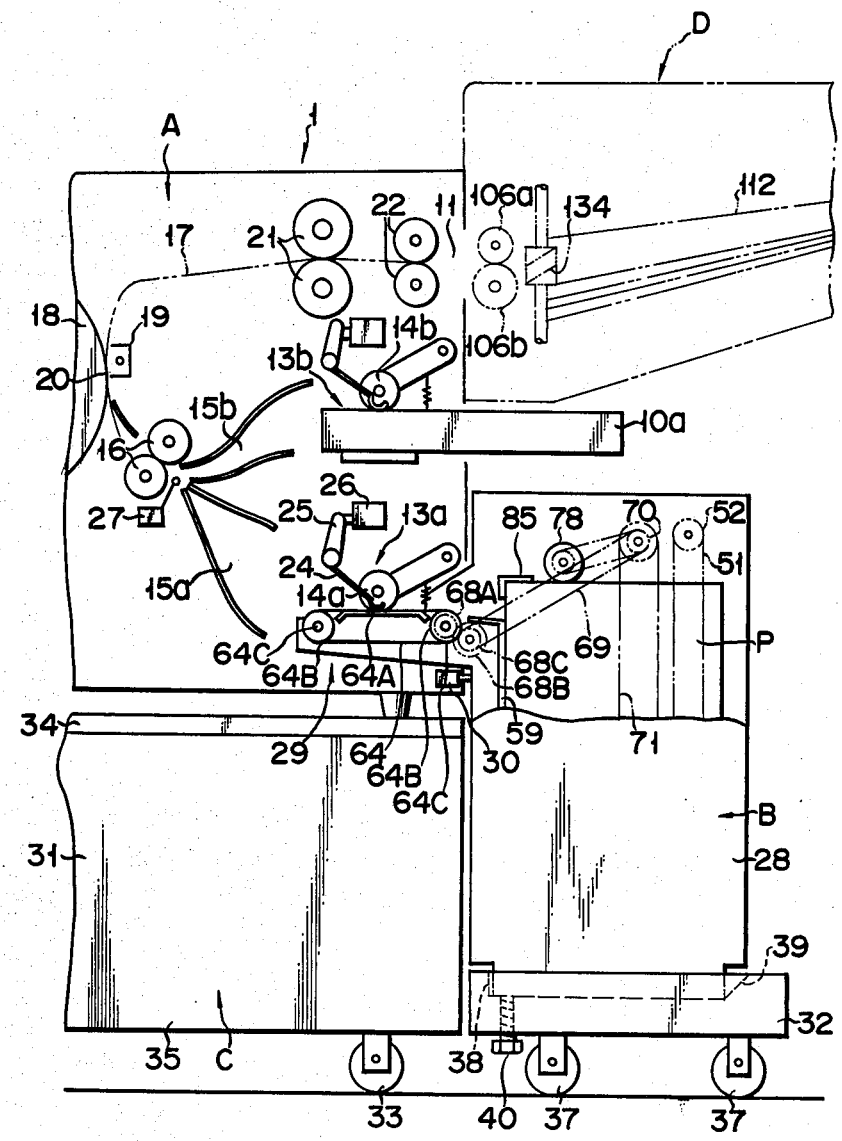
FIG. 3 is a sectional view showing schematically the feeder unit mounted in an electrostatic copying machine.

The sorter unit B for receiving copied sheets P exhausted from a sheet exhaust outlet 11 formed at the upper part of the right side face of the body 4 shown in FIG. 3 is arranged at the upper section of the cassette 10 and the feeder unit B. Takeup rollers 14b, 14a are, as shown in FIG. 2, brovided respectively as takeup members at the sheet feeders 13a, 13b of the body 4, to which the left side ends of the cassette B and the feeder unit B are inserted. When the rollers 14a, 14b are selectively operated, the specified sheet P in the cassette 10 or the feeder unit B is taken out one by one.

Thus, the sheet P supplied from the feeder 13a or 13b is guided through respective guide passages 15a and 15b into between a pair of feed rollers 16, and is fed into a common feed passage 17 upon rotation of the feed rollers 16. When the copy sheet P is passed through a transfer section 20 defined between a photosensitive drum 18 and a transfer unit 19 thereat, a toner image on the drum 18 is transferred onto the copy sheet P. Thereafter, the transferred copy sheet P is passed between a pair of fixing rollers 21, and the copy sheet P of the toner image is fixed. The copied sheet P is exhausted through a pair of sheet exhausting rollers 22 provided at the end of the feed passage 17 into the sorter unit D. In this case, a toner image is formed on the photosensitive drum 18 corresponding to the image of the original through an exposure 2, an optical system 3, a charger 12 and a developing unit 32 known per se.

As shown in FIG. 3, sheet existence/absence detecting levers 24 of the same construction rotatably supported at one end at a shaft 23 are, on the other hand, provided in the vicinity of the takeup rollers 14a, 14b of the upper and the lower feeders 13b, 13a. The free end of the upper detecting lever 24 is led onto the cassette 10 to make contact on the sheet P in the cassette 10. A switch operating lever 25 is fixedly secured to the one end of the upper detecting lever 24. A microswitch 26 is provided as a detector at the position confronting with the switch operating lever 25.

When the sheet P is contained in the cassette 10, the microswitch 26 will not, since the end of the detecting lever 14 is deflected upwardly, operate and is opened in OFF state. When all the sheet P is taken out of the cassette 10, the end of the detecting lever 24 is thereby lowered, and the switch operating lever 25 will press the actuator of the microswitch 26. The microswitch 26 is closed in ON state by this depression. It is noted that the detecting lever 24 is also operated upon removal of a sheet guide section (shown in FIG. 6), which will be hereinafter described in greater detail with respect to the feeder unit B. The detecting lever 24, the switch operating lever 25 and the microswitch 26 form a sheet existence/absence detecting mechanism of the electrostatic copying machine A side. A microswitch 27 is provided as a sheet passage detector between the feed rollers 16 and the guide passage 15a.

Figure 4:
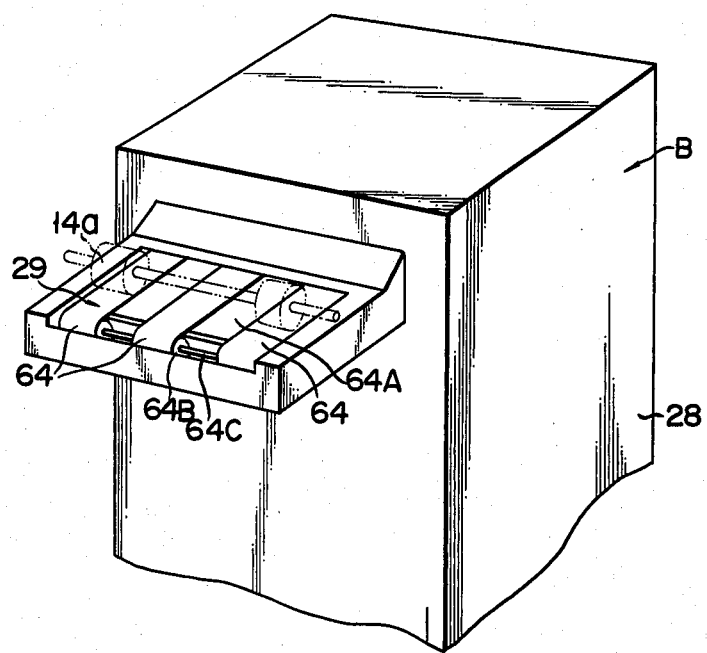
FIG. 4 is a perspective view showing the feeder unit.
Figure 5:
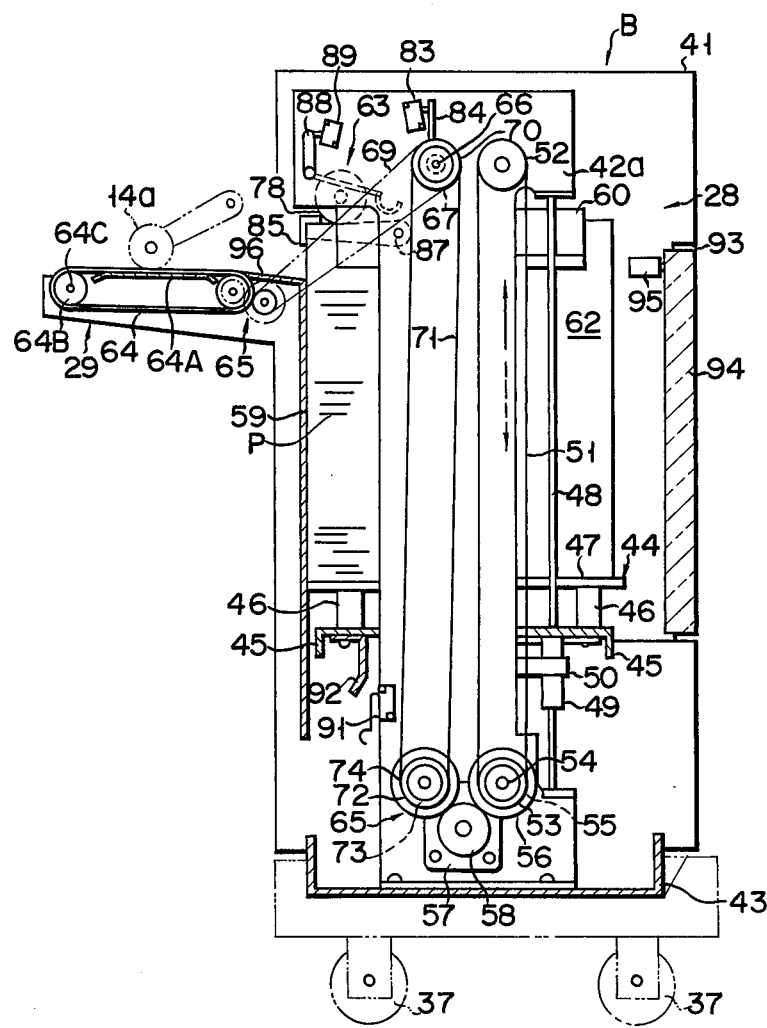
FIG. 5 is a longitudinal sectional view showing the feeder unit.

As shown in FIGS. 3 through 5, the feeder unit B generally consists of a feeder body 28 for sequentially taking up the uppermost sheet P one by one of a number of stacked sheets P, and a sheet guide section 29 projected toward the sheet taking up direction (the left side of the drawings) of the feeder body 28. A truck 37 is mounted underneath the body 28 of the feeder unit B so that the feeder unit B may move on a floor surface. It is noted that a suitable stopper member may be provided at the truck 37 so as to stop at the time of using the image forming system. The sheet guide section 29 is so mounted at the end at the right side lower part of the electrostatic copying machine A at the feeder 13a shown in FIGS. 2 and 3 as to be disposed within the sheet feeding section of the electrostatic copying machine A (see FIGS. 3 and 5). A changeover switch 30 (in FIG. 3) provided in the body 4 of the electrostatic copying machine A will operate ON or OFF upon attachment or removal of the feeder unit B to or from the electrostatic copying machine A in this case. This switch 30 serves to switch to sheet feed controlling state with two cassettes in the electrostatic copying machine A when it is closed ON or to switch to sheet feed controlling state with one cassette and the feeder unit B when it is opened OFF.

Figure 6:
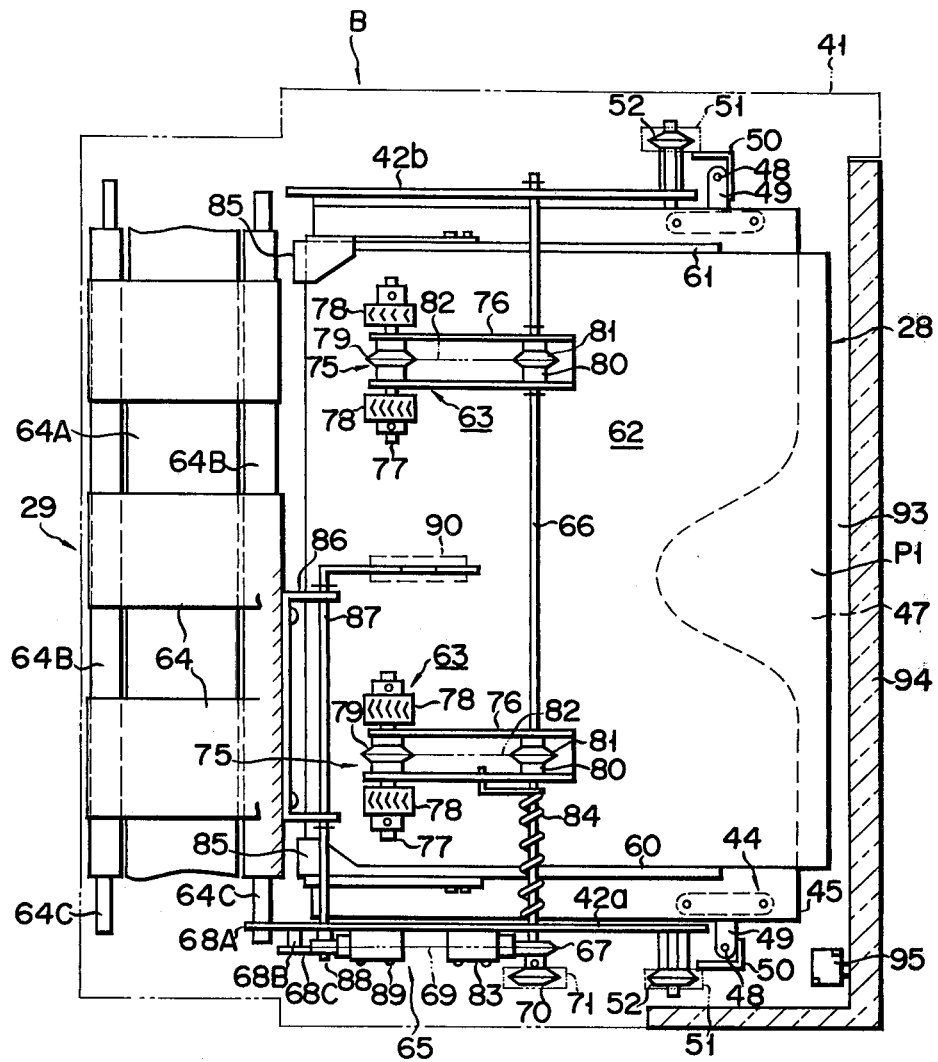
FIG. 6 is a lateral sectional view showing the feeder unit.
Figure 12:
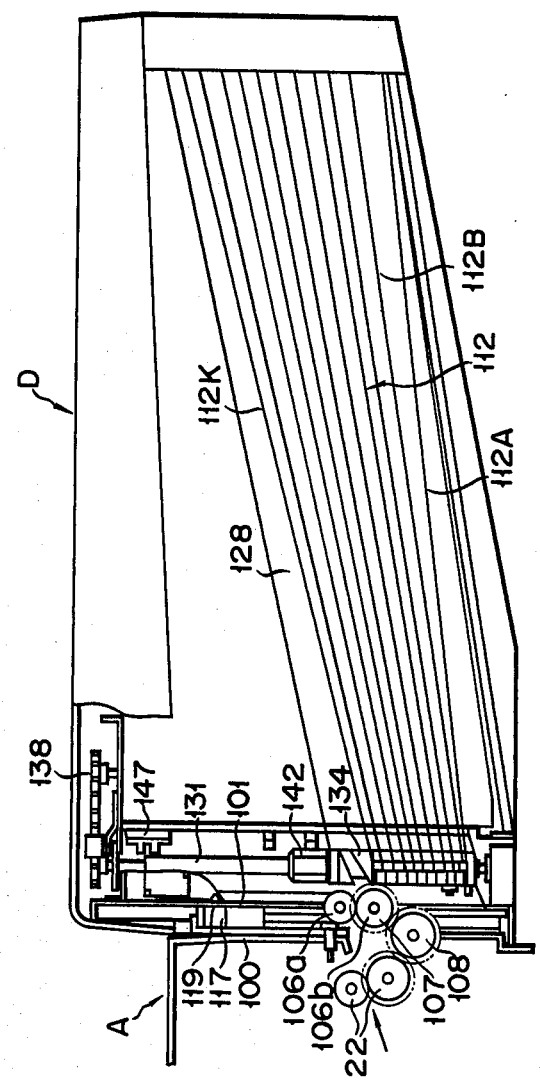
FIG. 12 is a side view showing partly cut-out of a sorter unit mounted on an electrostatic copying machine.

The feeder unit B will be described in detail with reference to FIGS. 3 through 11. The feeder body 28 has a housing 41. In the housing 41 are stood front and rear frames 42a and 42b, as shown in FIG. 5, in such a manner that the lower ends thereof are fixedly secured to a base frame 43 forming the bottom of the housing 41. A sheet feeding platform 44 is provided between the frames 42a and 42b. The platform 44 has a movable base 45 elevationally movably supported by means, which will be described in greater detail, and an elevator tray 47 mounted through a spacer 46 at the upper part of the base 45. A pair of guide shafts 48 secured fixedly to the respective frames 42a and 42b at both ends through respective horizontal mounts (not shown) to elevationally extend as shown in FIG. 6, at the right end face side of the drawings of the frames 42a, 42b. Elevator arms 49 are respectively mounted at the shafts 48 elevationally movably therealong. The movable base 45 is secured at both ends to the elevator arms 49. Thus, the platform 44 can be smoothly elevationally moved.

The respective elevator arms 49 are connected through connecting links 50 to endless elevator chains 51, respectively. The elevator chains 51 are respectively engaged through upper and lower sprockets 52 and 53 along the guide shafts 48 at the outsides of the frames 42a, 42b. The lower sprocket 53 of rear side is engaged with one end of a rotating shaft 54 horizontally passed through the frames 42a, 42b. The lower sprocket 53 of front side is secured to the output side of an elevator feeding electromagnetic clutch 55 fixedly secured to the front side end of the rotating shaft 54. These sprockets 53 are constructed to integrally rotate upon rotation of the shaft 54. A gear 56 is secured to the member of input side of the clutch 55. This gear 56 is engaged in mesh with a drive gear 58, to which the driving force of a reversible motor 57 is transmitted. When the motor 57 is rotated normally or reversely, the elevator chains 51 are driven in a normal direction (counterclockwise direction as designated by a solid line with an arrow in FIG. 5) or in a reverse direction (clockwise direction as designated by a broken line with arrow in FIG. 5). Guide plates 59, 60, 62 for defining the three directions of the front end and both side ends of the sheet P are arranged along the moving passage of the platform 44 in the housing 41. A sheet containing section 62 is formed at the upper surface side of the platform 44 of these guide plates 59, 60, 61. A sheet exhausting mechanism 63 is arranged at the upper front part of the containing section 62. The sheet guide section 29 is formed at the sheet feeding direction side of the sheet exhausting mechanism 63.

On the other hand, a sheet feeding belt driving mechanism 65 arranged at the sheet guide section 29 for driving one or more sheet feeding belts 64 as conveyor members confronting the takeup roller 14a is arranged in the space of the frame 42a side of the housing 41. The uppermost sheet P is exhausted through the sheet exhausting mechanism 63, and is then supplied through the takeup roller 14a and the sheet feeding belts 64 to the feed rollers 16.

As shown in FIGS. 3 through 6, rollers 64B respectively mounted on a pair of shafts 64C are disposed at a predetermined interval as a pair in the sheet guide section 29. At least more than one (three in this shown embodiment) sheet feeding belts 64 made of flexible material such as rubber or the like are engaged between the rollers 64B. A backup plate 64A for supporting the lower surfaces of the upsides of the belts 64 are disposed, as shown in FIG. 7, inside the belts 64 in such a manner that the belts 64 may not deflect. The driving mechanism 65 has a gear 68A mounted on one side (at the right side of the drawings) of the shaft 64C of the rollers 64B. The gear 68A is engaged in mesh with a gear 68B secured to a shaft having a sprocket 68C. The sprocket 68C is engaged through an endless chain 69 with a sprocket 67. An upper sprocket 70 is integrally concentrically engaged with the sprocket 67. The upper sprocket 70 is connected through an endless feed chain 71 to a lower sprocket 72 (shown in FIG. 5) disposed at the lower position than the upper sprocket 70. The lower sprocket 72 is fixedly secured to a member at the output side of a sheet feeding electromagnetic clutch 73. A gear 74 is secured to a member at the input side of the clutch 73. The gear 74 is engaged in mesh with the gear 58 or the motor 57. When the clutch 73 is engaged "ON" in accordance with a sheet feed signal, the drive shaft 66 and the belt 64 of the mechanism 63 are driven at the sheet feeding timing. When the feeder unit B is securely mounted in the electrostatic copying machine A, the belts 64 are transferred in contact with the roller 14a of the sheet feeder 13a to hold the sheet P therebetween and to then feed the sheet P.

The sheet exhausting mechanism 63 has a pair of sheet feeding roller units 75. The roller units 75 are constructed as shown in FIG. 6. That is, the sheet exhausting mechanism 63 has the common drive shaft 66, and a pair of arms 76 of the roller units 75 are rotatably mounted on the drive shaft 66. A sheet feeding roller shaft 77 is mounted rotatably and elevationally rockably around the longitudinal center as a fulcrum at the free end side of the respective arms 76. Sheet feeding rollers 78 are respectively secured to both ends of the shafts 77. On the other hand, drive sprockets 81 are respectively mounted through one-way clutches 80 at the drive shafts 66 corresponding to the driven sprockets 79. These sprockets 79, 81 are engaged via endless chains 82. Thus, the arms 76 are rockably moved around the drive shaft 66 as its rotating center in the range until a stopper shaft (not shown) makes contact with the end face of a positioning long hole (not shown) in the roller units 75 thus constructed.

As shown in FIG. 8, an actuator 84 for transmitting the elevational rocking motions of the arms 76 to an upper limit switch (e.g., a microswitch) 83 is provided at the left end of the drive shaft 66. This actuator 84 is, for example, formed by bending a wire and is capable of being rotated around the drive shaft 66 as a center by externally engaging the arcuate part formed at the intermediate part of the wire with the drive shaft 66. The actuator 84 is further engaged at one end with the arms 76 and is confronted with an actuator of the limit switch 83. When the sheets P in the containing section 62 are reduced in number as designated by solid lines in FIG. 8, the rollers 78 are lowered thereupon. The actuator 84 will depress the actuator of the switch 83 as the rollers 78 are lowered, resulting in the closure of the switch 83 ON. A sheet feeding platform 34 will rise when the switch 83 is closed. When the uppermost sheet P is raised higher than a predetermined height as indicated by two-dotted chain line in FIG. 8, the rollers 78 will rises thereupon. The depression of the actuator of the switch 83 by the actuator 84 is released when the rollers 78 are raised. Thus, the switch 83 is opened OFF, and the platform 44 will stop. When the uppermost sheet P is lowered upon supply of the sheets and when the uppermost sheet P is raised upon rising of the platform 44, the rollers 78 and double sheet feed preventive separating pawl 85 for retaining both the corners of the sheet P at the sheet exhausting side are placed on the sheets P. Accordingly, even if the uppermost sheet P is elevationally fluctuated, the stacked state of the sheets P is maintained, and it does not affect adverse influence to the exhaust of the sheet P.

As shown in FIG. 6, a sheet existence/absence detecting lever 87 rotatably held at a holding member 86 is provided in the vicinity of the roller unit 75 of left side. The free end and hence the end of the detecting lever 87 is led onto the elevator tray 47 of the platform 44. A switch operating lever 88 is secured to the base end side of the detecting lever 87. A microswitch 89 is provided as a detector at the position confronting the end of the lever 88. On the other hand, an end falling hole 90 is formed to confront the end of the detecting lever 87 at the platform 44 having the tray 47. When the platform 44 having the tray 47 is disposed at the lower position or all the sheets P are taken out, the end of the detecting lever 87 is rocked downwardly to the lower limit position as designated by solid lines in FIG. 9. Thus, the lever 88 will press the actuator of the microswitch 89, resulting in the closing of the switch 89 ON. When the platform 44 having the tray 47 is, on the other hand, raised, the uppermost sheet P will make contact with the end of the detecting lever 87. The lever 88 will separate from the actuator of the switch 89 slightly before the uppermost sheet P rises the detecting lever 87 to cause the lever 87 to make contact with the rollers 78. Thus, the microswitch 89 is opened OFF. Thus, the detecting lever 87, the switch operating lever 88 and the microswitch 88 form the sheet existence/absence detecting mechanism at the feeder unit B side.

As further shown in FIGS. 5 and 10, a lower limit switch (e.g., a microswitch) 91 is provided at the lower position of the housing 41. This switch 91 is provided to detect the lower limit position of the platform 44. This switch 91 is operated when the actuator of the switch 91 is pressed by an operating piece 92 projected at the rear left side of the lower surface of the movable base 45 of the platform 44.

As shown in FIG. 5, an opening 93 is formed over the rear surface and the left side rear surface of the housing 41 of the feeder unit B. The sheet P can be readily supplied through the opening 93 into the sheet containing section 62. The opening 93 is closed by a door 94 made of a transparent member through which the interior can be investigated. This door 94 may be opened and closed as required. The open state of the door 94 is detected by a door opening/closing detecting switch (e.g., a microswitch) 95 as shown in FIGS. 3 through 6 and 11.

As shown in FIGS. 1 through 3, on the platform C is mounted a copying machine carrier 31 and a truck attached underneath the bottom surface side thereof. The copying machine carrier 31 has the table 34 for placing the electrostatic copying machine A thereon. An accessory containing chamber 36 closed by doors 35 on the front surface is formed under the table 34.

Figure 13:
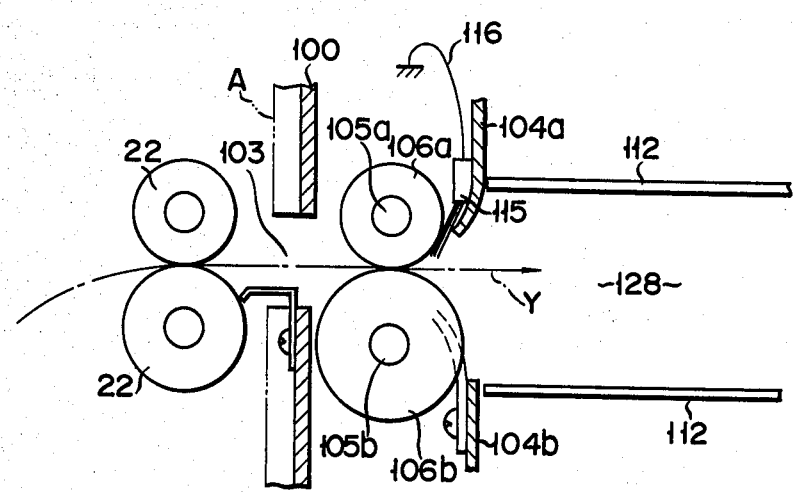
FIG. 13 is a sectional view showing the relationship between the sheet exhausting unit of the electrostatic copying machine and the conveying rollers of a sorter unit.
Figure 14A:
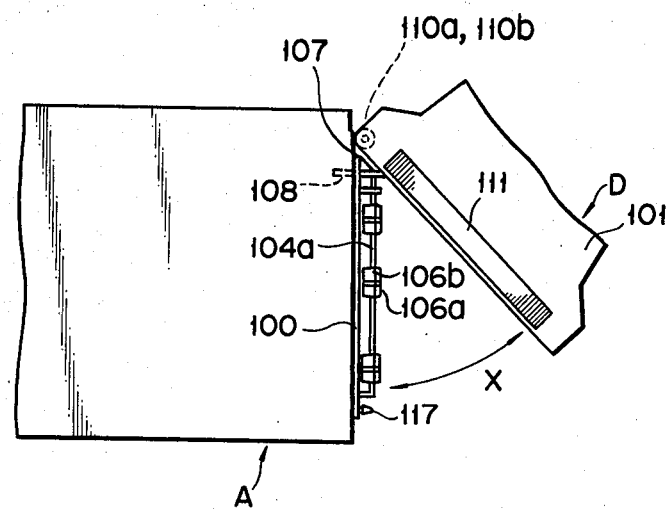
Figure 15B:
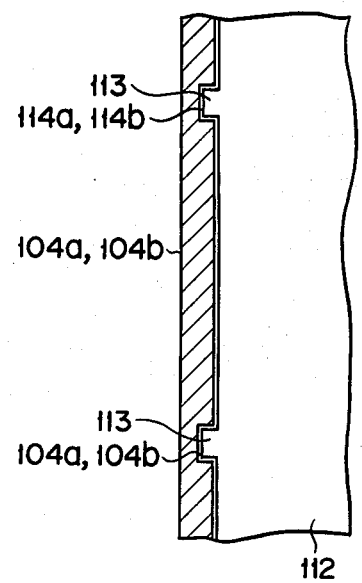
FIG. 15B is a plan view showing the engaging state of the bin with the supporting member.
Figure 15A:
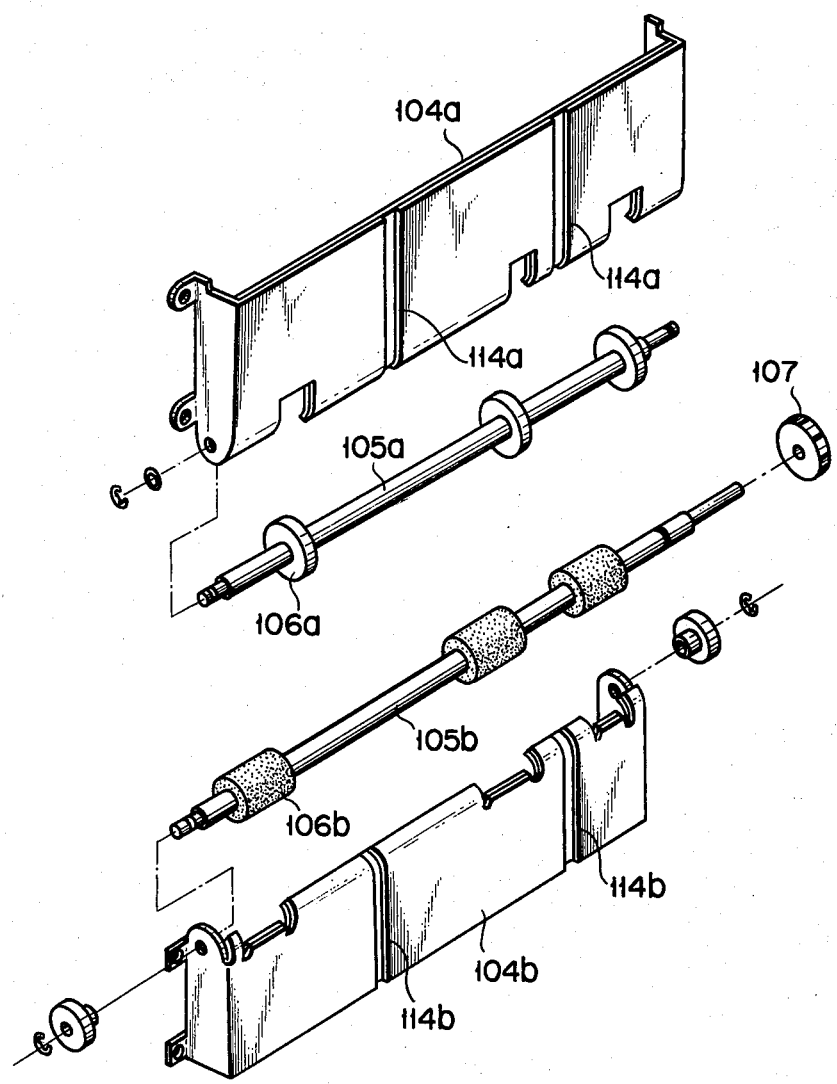
FIG. 15A is an exploded perspective view showing the modified example of the conveyor rollers.

The sorter unit D is constructed as shown in FIGS. 12 through 27. That is, the sorter unit D has a stationary member 100 and a containing member 101 shown in FIGS. 12 through 14B. The stationary member 100 is mounted through fittings 102 such as screws or the like at the sheet exhausting section of the body 4. A sheet inserting port 103 for exhausted sheets from the sheet exhausting section of the body 4 is provided, as shown in FIG. 13 at the stationary member 100. U-shaped sectional supporting guide members, which will be hereinafter referred as to "supporting members", 104a, 104b are respectively mounted at the upper and the lower positions confronting one another at the port 103. Conveyor rollers 106a, 106b are respectively disposed through shafts 105a, 105b at the positions confronting the supporting members 104a, 104b between the supporting members 104a, 104b and the stationary member 100. A gear 107 is mounted at the rear side of the lower shaft 105b. The gear 107 is connected to the driving section of the rollers 22 of the sheet exhausting section of the body 4 through an idle gear 108. Thus, the shaft 105b is rotated simultaneously in the same direction as the rollers 22 upon rotation of the rollers 22. The containing member 101 is detachably supported rotatably in the direction of an arrow x by pins 110a, 110b, as shown in FIG. 14A, at the rear side of the stationary member 100. The supporting member 104a serves to exhaust hot blast exhausted from the body 4 from an outlet 111 formed at the containing member 101. It is noted that, when engaging projections 113 are formed at the ends of respective bins 112, engaging recesses, e.g., guide grooves 114a, 114b are formed to extend elevationally as shown in FIGS. 15A, 15B so that the conveyed sheet P may not be engaged with the ends of the supporting members 104a, 104b and the bins 112. It is also noted that the engaging recesses are formed at the bins 112 and the engaging projections are formed at the supporting members 104a, 104b. Further, it is noted that the upper roller 106a of the rollers 106a, 106b may be formed, for example, of iron and the lower roller 106b may be formed, for example, of rubber.

Figure 25:
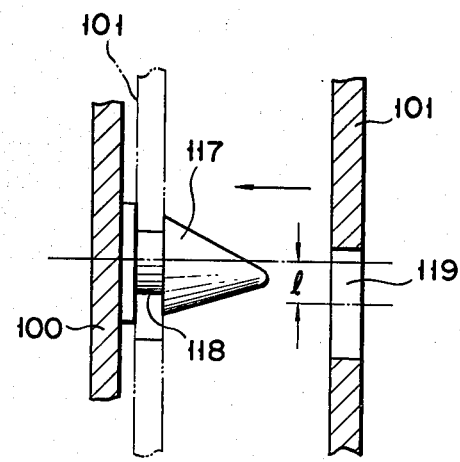
FIG. 25 is a sectional view showing the holder together with the containing member.

As further shown in FIG. 13, a static eliminator 115 is disposed at the supporting member 104a of the stationary member 100. The static eliminator 115 is grounded through a lead wire 116. The static eliminator 115 is formed, for example, of carbon fiber or the like and is disposed, as shown in FIG. 13, in space from the conveying surface Y of the sheets P at the lower end. A holder 117 for holding the containing member 101 is mounted at the time of inserting the member 101 at the front side of the stationary member 100. This holder 117 is formed at the end, for example, as shown in FIG. 25, of downwardly eccentrically conical shape. An engaging recess 118 is formed at the rear end of the holder 117. The holder 117 of the stationary member 100 serves to guide the engaging hole 119 perforated at the member 101 along the conical surface and to engage at the end within the engaging recess 118 so as to hold the member 101. The stationary member 100 and the containing member 101 are so disposed that the distance l between the center of the engaging recess 118 of the member 100 and the center of the engaging hole 119 of the member 101 is defined as l. In this manner, when the member 101 is opened, it is raised upwardly to float from the engaging recess 118 and is thus removed.

A frame 120 of the containing member 101 is, as shown in FIG. 14B, detachably mounted along the direction of an arrow x through the engagement of a pair of connectors 121 of the rear side and the pins 110a, 110b of the stationary member 100, and is horizontally openably mounted at the stationary member 100. The engaging hole 119 for engaging detachably the holder 117 of the member 100 is formed at the front side of the frame 120. A square opening 122 is formed at the frame 120. The ends of a plurality of bins (11 pieces designated by 112A through 112K in FIG. 16) 112 are disposed at the opening 122 of the frame 120. The intervals between the respective bins 112 and the supporting members 104a, 104b are formed at least equal to or thicker than the thickness of one sheet P, thereby preventing the clogging of the sheet P in the space. The bins 112 are, for example, formed of elastic material, e.g., spring steel plate or reinforced plastic board containing filler such as cellulose, asbestos, glass fiber, carbon fiber or boron fiber or the like.

Figure 18:
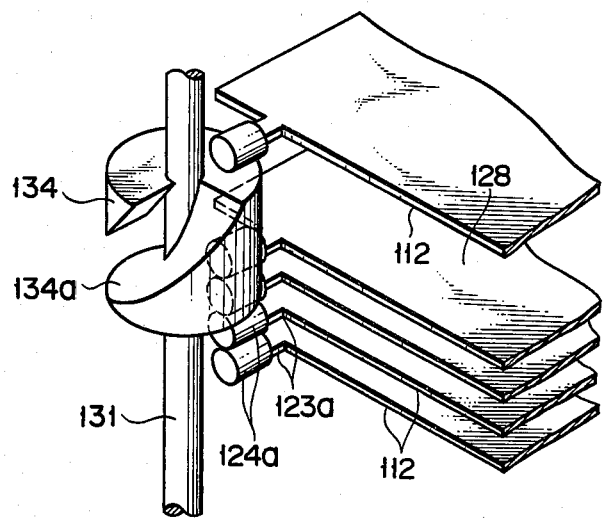
FIGS. 18 and 19 are respectively perspective and side views showing the cam unit and the bin together.
Figure 19:
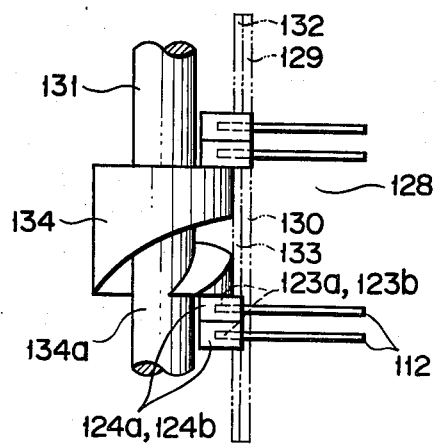
Figure 20:
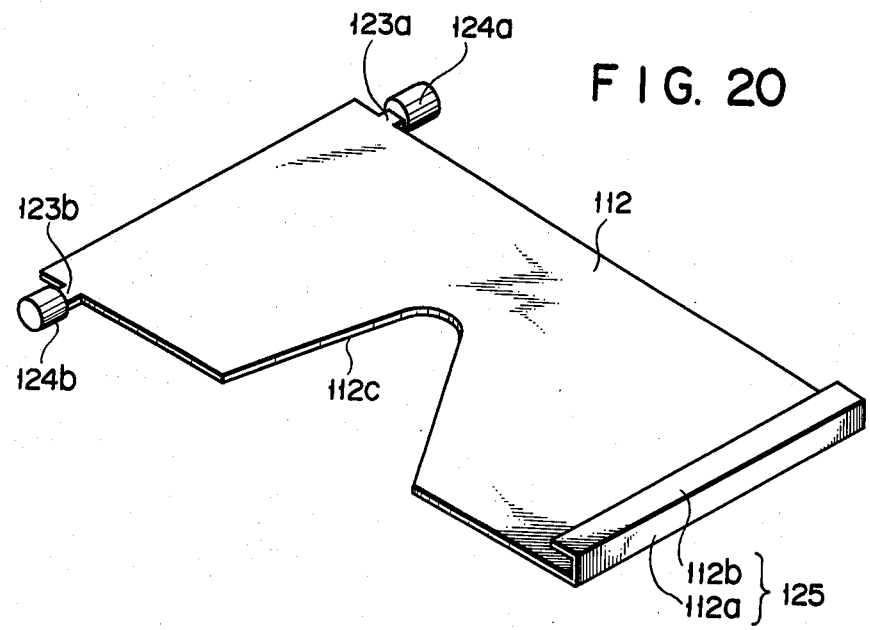
FIG. 20 is a perspective view showing the bin taken out.
Figure 22A:
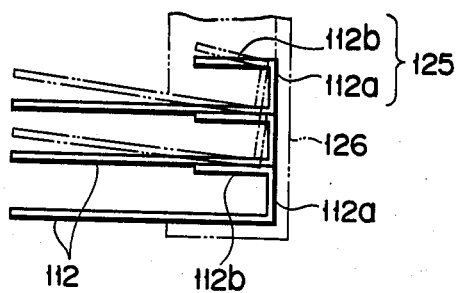
FIG. 22A is a side view showing the end of the bin.
Figure 22B:
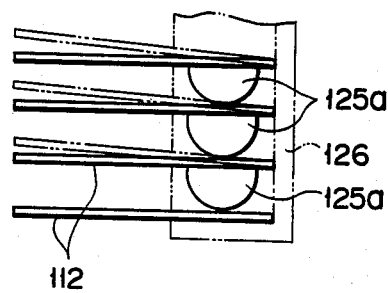
FIG. 22B is a side view showing the modified example of the ends of the bins shown in FIG. 22A.

As shown in FIGS. 18 through 20, projecting pieces 123a, 123b are respectively formed to confront one another at both sides of the frame 120 side. Sliders 124a, 124b of circular section are engaged with the projecting pieces 123a, 123b, respectively. The adjacent bins 112 are isolated via the sliders 124a, 124b. As shown in FIG. 22, projections 125 are so formed that the adjacent bins 112 may be isolated from each other at the opposite sides of the frame 120 of the respective bins 112. More particularly, in the bins 112 shown in FIG. 20, the edges of the bins 112 are erected to form rising parts 112a, and the edges of the rising parts 112a are bent horizontally at the bins 112 side to form a horizontal parts 112b. As a consequence, the adjacent bins 112 are isolated via the rising parts 112a and the horizontal parts 112b of the bins 112. In the bins 112 shown in FIG. 22B, a member 125a of substantially spherical shape is mounted at the lower part of the bin 112. The member 125a serves to contact the adjacent bin 112 and to isolate adjacent bins 112.

Figure 23:
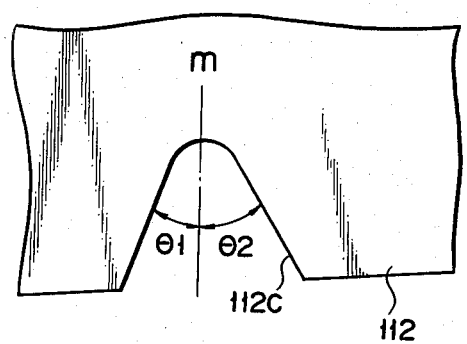
FIG. 23 is a plan view showing the cut-out part formed on the bin.
Figure 21A:
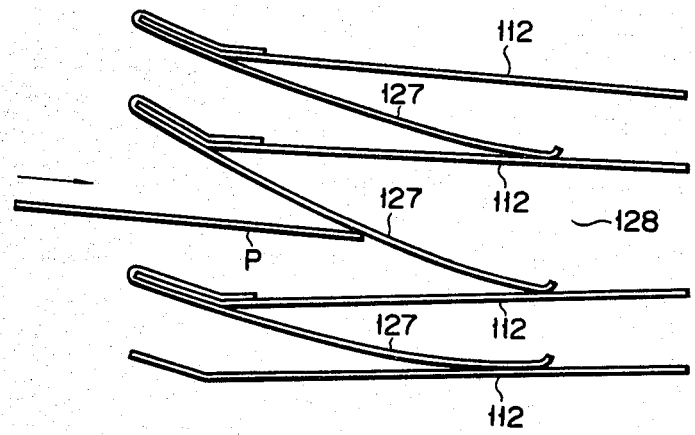
FIG. 21A is a side view showing the container defined by the adjacent bins therebetween.
Figure 21B:
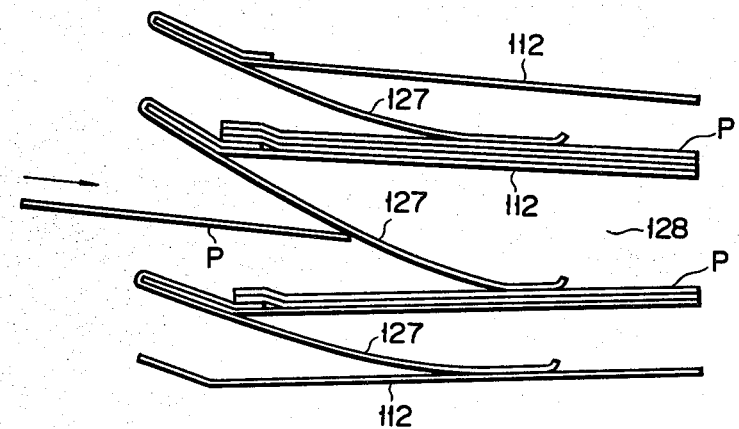
FIG. 21B is a side view showing copied sheets contained in the container.

A guide member 126 for defining the movement of the bin 112 (in elevational direction and in rightward direction of the drawings) is disposed at the right side of the drawings at each of the bins 112. Further, a notch 112c for exhausting the containing sheet P is formed at the intermediate part of the front side of each of the bins 112. The notch 112c of the bin 112 is too formed, as shown in FIG. 23, in such a manner that the angle $\theta_1$ between the reference line m and the left side edge is smaller than the angle $\theta_2$ between the reference line m and the right side edge with the reference line m crossing perpendicularly to the longitudinal axis of the bin 112 as a reference. This angular difference is provided so that, even when the sheet P contained between the adjacent bins 112 is partly temporarily suspended at the notch 112c, it should be floated again by the right side edge and should be then smoothly placed on the bin 112. As shown, for example, in FIGS. 21A and 21B, a controlling member 127 made of Mylar material or the like is mounted at one end thereof at the frame 120 side of each of the bins 112. The member 127 is so disposed at the other end thereof as to be contacted with the upper surface of the lower adjacent bin 112. The controlling member 127 serves to control the sheet P contained in the sheet containing section 128 defined between the adjacent bins 112 and to prevent the sheet P from floating or displacing. The end of each bin 112 is inclined upwardly, thereby securely holding the sheet.

Figure 17:
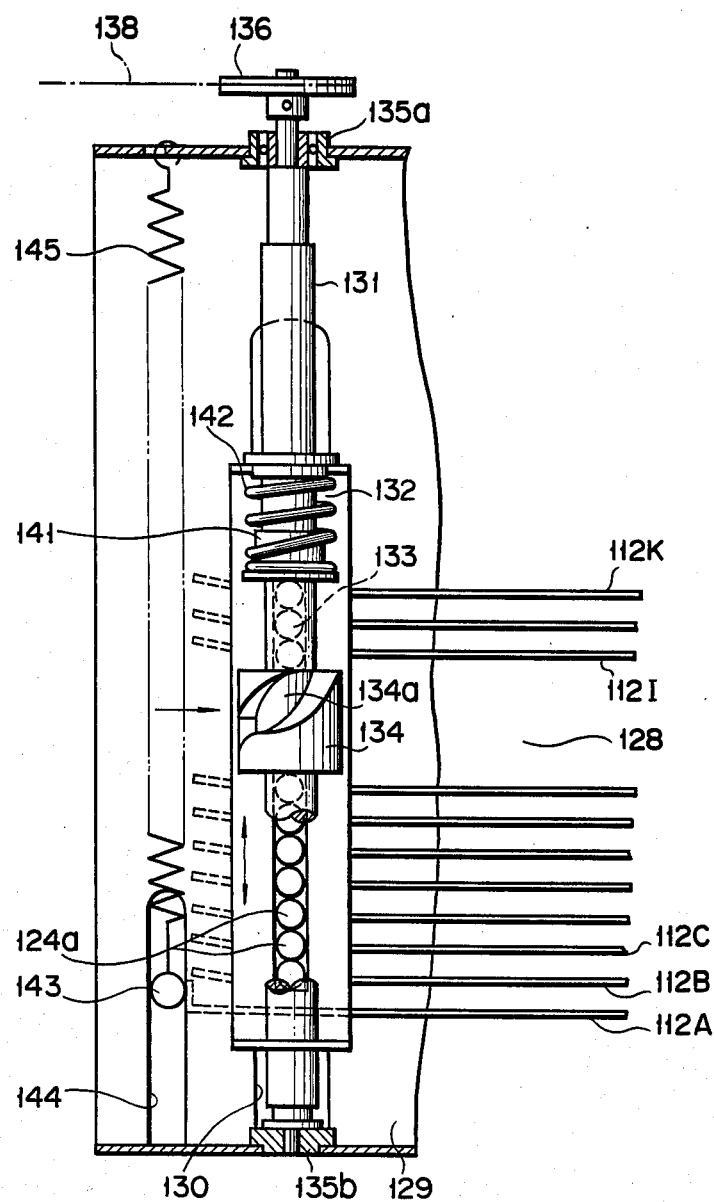
FIG. 17 is a side view showing the bin moving mechanism.

As shown in FIGS. 17 and 19, the sliders 124a, 124b of each bin 112 are externally projected through the long hole 130 perforated at a frame 129. A rotating shaft 131 extending vertically is provided at the frame 129. A movable member 132 is provided movably along the vertical direction at the shaft 131. The sliders 124a, 124b are passed also through the long hole 133 formed at the member 132. The sliders 124a, 124b of each bin 112 are engaged with a cam 134 secured to the intermediate part of the shaft 131. The shaft 131 is rotatably disposed through bearings 135a, 135b at the frame 129. A sprocket 136 is mounted at the upper end of the shaft 131. The sprocket 136 is, as shown in FIG. 16, connected through a chain 138 and an idle gear 139 to a sprocket 139 connected to a reversible motor 140. The cam 135 secured to the shaft 131 is normally or reversely rotated upon normal or reverse rotation of the motor 140.

The motor 140 serves to rotate the shaft 131 one revolution everytime the sheet P is exhausted to the sorter unit D. More particularly, the groove 134a of the cam 134 of the shaft 131 is so spirally formed at a predetermined angle, as shown in FIG. 17, as to move from above to downwardly or from below to upwardly the sliders 124a, 124b of the bin 112 everytime the cam 134 rotates normally or reversely one revolution. The cam 134 of the shaft 131 is disposed substantially at the same position as the conveying surface Y of the sheet P. (as shown in FIG. 13). The axial length of the cam 134 is so formed substantially equal to the interval of the sheet containing section 128 defined between the bins 112 and 112 at the containing position. A holding member 141 making contact with the sliders 124a, 124b of the bin 112K of the uppermost stage at the bottom is engaged axially movably with the shaft 131. The holding member 141 is energized in a direction that the holding member 141 makes contact with the sliders 124a, 124b by, for example, the first compression spring 142 as the first energizing member. Consequently, the sliders 124a, 124b of each bin 112 are pressed by the cam 134 to securely move the bin 112.

A pin 143 is mounted at the left side of the bin 112A of the lowermost stage. The pin 143 is externally projected through the long hole 144 perforated at the frame 129. The second energizing member, e.g., a tension spring 145 is provided at one end thereof at the projected pin 143 and is provided at the other end thereof at the upper end of the frame 129. This tension spring 145 serves to urge the bins 112 disposed lower than the cam 134 to the lower surface of the cam 134. As a result, the bins 112 disposed lower than the cam 134 can be, upon upper movement of the cam 134, securely moved upwardly.

Figure 24:
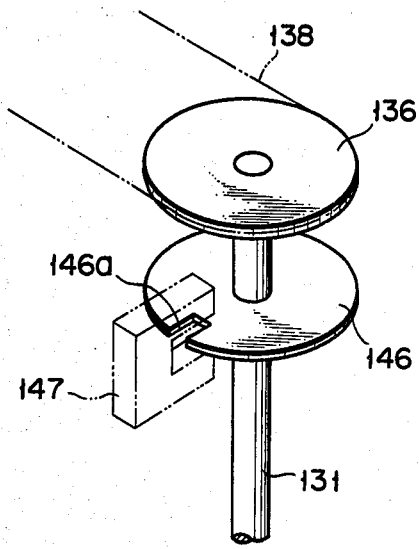
FIG. 24 is a perspective view showing the cam rotation detecting mechanism.

As shown in FIG. 24, a disc 146 is mounted at one side (at the rotating shaft of the rear side in FIG. 24) of the rotating shaft 131. A notch 146a is formed at the circumference of the disc 146. This notch 146a is detected by a detector 147 mounted at the frame 129, which detector thereupon detects one revolution of the shaft 131. The shaft 131 is intermittently rotated normally or reversely by the reversible motor 140 in accordance with the detected result to thereby sequentially move both the pins 112 disposed at both sides of the cam 134 of the shaft 131 from above to downwardly or from below to upwardly, resulting in the containing of the sheet P.

The bin 112 of the uppermost stage, e.g., the bin 112K is disposed, when the sheet P is contained in the sheet containing section 128 of the uppermost stage, under the cam 134. That is, the bin 112 does not exist above the cam 134. Consequently, the respective bins 112 are disposed under the cam 134, and the holding members 141 are urged by the urging force of the compression spring 142 downwardly to make contact with the top of the cam 134. It is noted that the same effect can also be obtained by forming the sheet containing section 128 of the uppermost stage between the bin 112K of the uppermost stage and another bin by disposing the another bin constantly located at the upper part of the cam 134 above the bin 112K of the uppermost stage.

Figure 28:
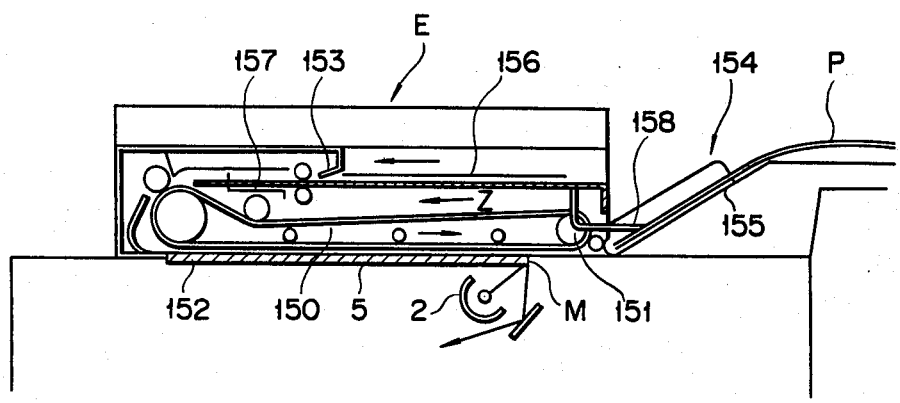
FIG. 28 is a sectional view showing schematically the original feeding device placed on the original placing platform.

As shown in FIG. 28, the original feeding unit E has an endless conveyor belt 150 which moves in the direction of an arrow z above the original placing unit 5 made of glass plate of the body 4. The conveyor belt 150 is engaged via a plurality of rollers 151. The conveyor belt 150 is driven by a drive roller 152 driven via a drive clutch (not shown) and a drive chain (not shown) connected to the driving system of the body 4. An original inserting port 153 is provided above the intermediate part of the upside of the conveyor belt 150. An exhaust port 154 is provided at the right side of the lower side of the conveyor belt 150. An original retainer 155 is so mounted at the end thereof obliquely upwardly at the exhaust port 154 as to have a predetermined angle $\theta_3$ (which is approx. 30° in this embodiment) or less. An original 156 is inserted from the original inserting port 153 with the surface to be copied upside. A switch 157 which is closed ON upon being depressed by the original 156 inserted into the original inserting port 153 is provided within the interior of the port 153. The original 156 is interposed between the conveyor belt 150 and the original placing unit 5, upon rotation of the drive roller 152, and is conveyed in a direction of an arrow z to the copying position M of the original placing unit 5. The original retainer 155 is provided at the exhaust port 154. The original 156 fed to the exhaust port 154 is exhausted via a sheet exhausting roller 151a onto the original retainer 155.

Figure 29:
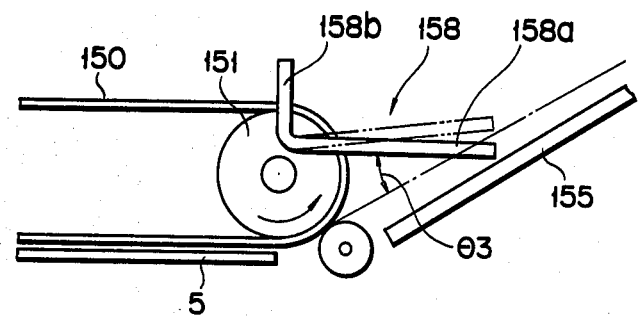
FIG. 29 is a sectional view showing the removed sheet exhausting unit of the original feeding device.
Figure 30:
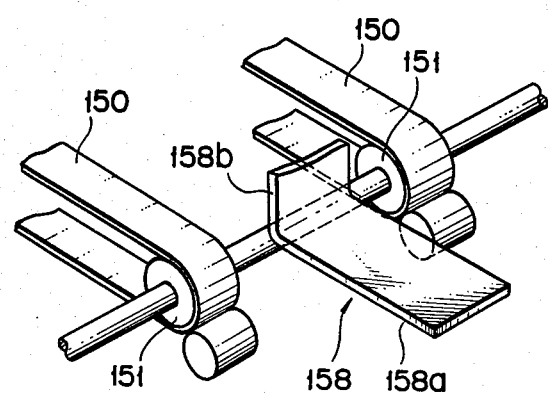
FIG. 30 is a perspective view showing the sheet exhausting unit shown in FIG. 29.

As shown in FIG. 29, a controlling member 158 of hook shape is provided to support at one piece 158a thereof in a horizontal state the other piece 158b at the exhaust port 154. The controlling member 158 is, for example, formed of Mylar (trade name) in a thin sheet shape with elasticity. The copied original 156 is exhausted between the end of the one piece 158a of the controlling member 158 and the original retainer 155, and is contained while being aligned within the original retainer 155. When a thick original, e.g., a page of a hook is copied, i.e., when it cannot copy with the original feeding unit E, the original feeding unit E is removed from the surface of the original placing unit 5. Thus, the thick original is placed directly on the original placing unit 5 with the surface to be copied downside in such a manner that the original feeding unit E is not positioned in the disturbed state.

The operation of the aforementioned image forming system will now be described in detail.

The feeder unit B is installed initially at the sheet feeder 13b at the lowermost stage of the electrostatic copying machine A. When the original 156 is inserted into the original inserting port 153 of the original feeding unit E with the surface to be copied upside, the original 156 will press the switch 157, thereby closing the switch 157. The drive roller 152 is rotated, upon closing of the switch 157, via the drive chain and the drive clutch, and the conveyor belt 150 is rotated in the direction of an arrow z. Thus, the original 156 is conveyed to the copying position M of the original placing unit 5 between the conveyor belt 150 and the original placing unit 5. When the original 156 reaches the copying position M with the surface to be copied downside, the drive clutch is disengaged, and the drive roller 152 will stop rotating. Thus, the conveyor belt 150 is stopped, and the original 156 will stop. When the original 156 is stopped, the aforementioned one copying step will be performed. After the copying step is finished, the drive roller 152 is rotated via the drive clutch, and the conveyor belt 150 is again fed. Thus, the original 156 is exhausted via the roller 151a onto the original retainer 155. The original 156 thus exhausted is passed at the end thereof between the original retainer 155 and the controlling member 158, and is retained at the vicinity of the rear end thereof by the controlling member 158. As a consequence, the originals 156 sequentially exhausted are inserted between the exhausted original 156 and the controlling member 158. Accordingly, the controlling member 158 is, as shown in FIG. 29, deflected in response to the thickness of the original 156 thus exhausted, and is returned to its original state at the step when the original 156 is removed from the original retainer 155. The original feeding unit E will repeat the aforementioned operations.

On the other hand, when the power switch (not shown) is closed and the copy switch 7 is closed ON, the electromagnetic clutch 73 and a motor normal rotation relay (not shown) are respectively driven in the feeder unit B. When the motor normal rotation relay is thus operated, the reversible motor 57 is normally rotated, and the clutch 73 is operated at this time. Thus, the drive shaft 66 of the sheet exhausting mechanism 63 is driven. In this manner, the sheet feeding rollers 78 of the roller units 75 interlocked to the drive shaft 66 is rotatably driven clockwise of the drawing, and the sheet feeding belts 64 of the sheet guide section 29 is rotatably driven counterclockwise in the state shown in FIG. 4. Accordingly, the uppermost sheet P in the sheet containing section 62 is exhausted upon rotation of the rollers 78 and is fed to the sheet guide section 29. The sheet P thus exhausted at this time is guided by the lower surface guide plate 96 integral with the guide plate 59 of the sheet guide section 29, and is led to the contacting part of the belts 64 and the takeup roller 14a provided at the sheet feeder 13a of the electrostatic copying machine A. The sheet P thus led is fed via the belts 64 and the roller 14a into the electrostatic copying machine A. Thus, the sheet P is initially fed from the feeder unit B to the copying machine A.

The sheet P thus supplied from the feeder unit B is guided through the guide passage 15a into between a pair of the feed rollers 16, and is guided to the transfer section 20 via the rotation of the rollers 16. When the sheet P is led between the feed rollers 16, the microswitch 27 is closed ON by the end of the sheet P at this time. The ON signal of the microswitch 27 is delayed in the deflecting time T of the sheet P by a delay circuit (not shown). The clutch 73 and the motor 57 are respectively deenergized by the delay signal from the delay circuit, and the sheet feeding operation is thus stopped. Thereafter and hence after the second sheet P, the sheet feeding operation similar to the above described operation is restarted by the sheet feed signal, and the sheets are continuously fed.

When the sheets P in the sheet containing section 62 is reduced by the continuous sheet feeding operation, the rollers 78 are lowered thereupon. When the rollers 78 are lowered to the predetermined position, the upper limit switch 83 is closed. When this switch 83 is closed ON, the clutch 55 and the motor normal rotation relay are driven. Thus, the motor 57 is normally rotated, and the platform 44 is raised. When the upper limit switch 83 is again opened upon rising of the platform 44, the clutch 55 and the motor 57 are deenergized. In this manner, the platform 44 is stopped at the upper limit position. When the intermittent rising operation of the platform 44 is repeated, it is so controlled that the uppermost sheet P in the sheet containing section 62 is constantly disposed within a predetermined sheet feeding range. When all the sheets P are exhausted, the end of the detecting lever 87 (in FIGS. 5, 6 and 9) will fall in the end falling hole 90 formed at the elevator tray 47 of the platform 44, and the microswitch 89 is thus closed. When the switch 89 is thus closed, a no sheet indication lamp (not shown) is energized, and an emptive indication is displayed on the indicator 9 of the operation panel 6.

When the emptive indication is displayed on the indicator 9 in this manner, an operator should open the door 94 and should supply the sheets P. More particularly, when the door 94 is opened, the switch 95 is closed ON. Since the lower limit switch 91 is opened in case that the platform 44 is not disposed at the lower limit position at this time, the clutch 55 and the motor reverse rotation relay are driven. When the motor reverse rotation relay is thus energized, the motor 57 will reversely rotate.

Since the clutch 55 is operated at this time, the platform 44 will fall. When the platform 44 is thus lowered to the lower limit position, the lower limit switch 91 (in FIGS. 5 and 10) is closed ON. When this switch 91 is closed ON, the clutch 55 and the motor 57 are deenergized. Thus, the platform 44 is stopped at the lower limit position. The sheets P are supplied onto the platform 44 in this state.

When this sheet supply is finished, the door 94 is again closed, thereby again opening the switch 95. Since the rollers 78 are disposed at the lower limit position at this time and the upper limit switch 83 is closed ON, the motor 57 is normally rotated, and the platform 44 is raised. When the upper limit switch 83 is opened upon rising of the platform 44, the platform 44 is stopped at the upper limit position, becoming standby state capable of feeding the sheet.

Further, the operation of the sorter D will be described in detail with reference to FIGS. 26A through 26D in such a manner that the operation is divided into a non-sorting mode, in which one sheet is copied (using the bin 112A of the lowermost stage) and a sorting mode, in which two or more copy sheets are copied (using the bins 112B through 112E except the non-sorting mode). The non-sorting mode is first instructed via the operation key (not shown) of the body 4. The sliders 124a, 124b of the bin 112A of the lowermost stage are disposed under the cam 134 of the shaft 131 via a sorting control circuit (not shown) in accordance with the instruction signal, and the sliders 124a, 124b of the bin 112B immediately above the bin 112A are disposed above the cam 134. Thus, the wide sheet containing section 128 is formed between the bin 112A and the bin 112B. The sheets P contained in the sorter unit D are contained via the rollers 106a, 106b between the bin 112A and the bin 112B, and predetermined number of sheets are sequentially contained (in FIG. 26A). Since the controlling member 127 made of Mylar is mounted at the frame 120 side of the bins 112 in this case, it can prevent the floating of the sheets P contained therein, and can securely contain the fed sheets P. Thus, it can prevent the clogging of the sheet. When the sheets P contained in the sheet containing section 128 are removed between the bin 112A and the bin 112B after the completion of the copying operation, the intermediate part of the upper bin 112B is deflected upwardly as shown in FIG. 27, and both are expanded to remove the sheets.

On the other hand, the sorting mode is instructed by pressing the operation key. The motor 140 is rotated via the sorting control circuit in response to the depression of the operation key. The rotation of the motor is transmitted through the sprocket 137, the idle gear 139 and the endless chain 138 to a pair of sprockets 136 to rotate them. The shaft 131 is rotated counterclockwise as indicated by the arrow in FIG. 16 by the rotation of the sprocket 136, and the cam 134 of the shaft 131 is simultaneously rotated. Thus, the sliders 124a, 124b of the bin 112B disposed on the upper horizontal surface of the cam 134 are introduced through the inlet (upper) of the groove 134a of the cam 134, and are moved to the lower horizontal surface of the cam 134 from the outlet (lower) via the groove 134a. Accordingly, the bin 112A of the lowermost stage disposed at the lower position is urged downwardly against the tension force of the tension spring 145 via the lowered bin 112B. Thus, the gap between the bins 112A of the lowermost stage and 112B becomes substantially equal to the size of the sliders 124a, 124b mounted at the bins 112A, 112B, and is disposed lower than the sheet conveying surface Y. When the bin 112B is moved under the cam 134, the bin 112C disposed above the cam is simultaneously moved to expand the space between the bins 112B and the 112C by the fact that the sliders 124a, 124b of the bin 112C are contacted with the upper horizontal surface of the cam 134 by the compression force of the compression spring 142 to form the wide sheet containing section 128. When the notch 146a of the disc 146 mounted on the shaft 131 is detected by the detector 147, the motor 140 is stopped in rotation by the signal from the detector. The copying machine A is operated to copy in this state. The copied and fixed sheet P is exhausted through the rollers 22 into the sorter unit D.

Figure 26A:
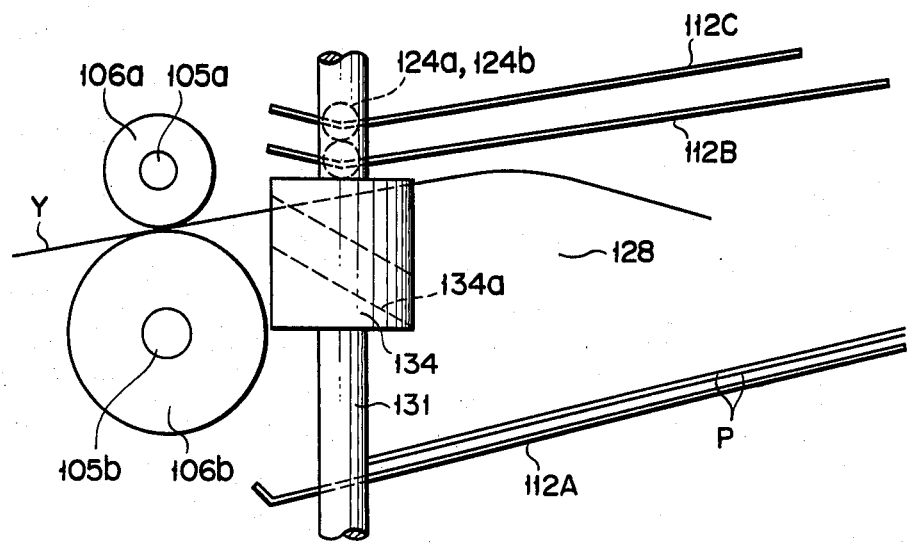
FIGS. 26A to 26D are respectively side views showing the differently operating states of the bin moving state.
Figure 26B:
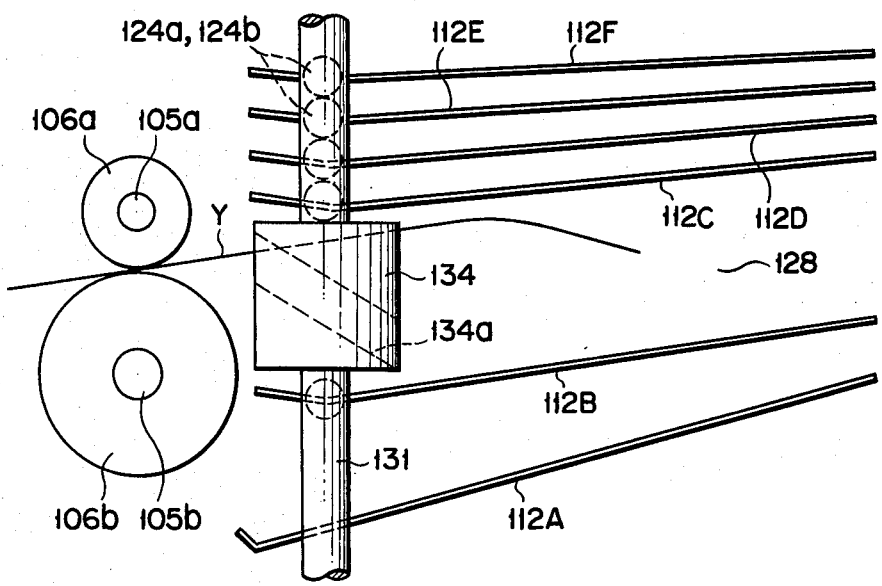
Figure 27:
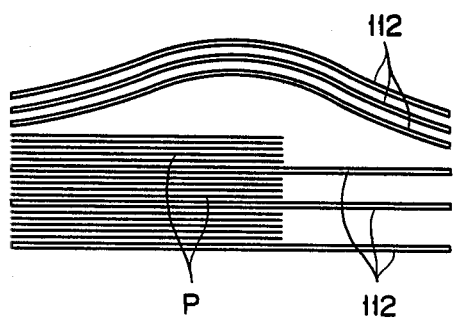
FIG. 27 is a side view showing the copied sheets contained in taken out state.

The sheet P thus introduced into the sorter unit D is, as shown in FIG. 26B, contained via the rollers 106a, 106b between the bins 112B and 112C. In this case, the detector (not shown) disposed at the position adjacent to the rollers 22 detects the rear end of the sheet P. The detection signal from the detector is applied to the sorting control circuit, which in turn rotates the motor 140. The rotation of the motor 140 is transmitted through the sprocket 137, the idle gear 139 and the endless chain 138 into a pair of sprockets 136 to rotate them. The shaft 131 is rotated counterclockwise as designated by an arrow in FIG. 16 by the rotation of the sprocket 136, and the cam 134 of the shaft 131 is accordingly simultaneously rotated. The sliders 124a, 124b of the bin 112C disposed on the upper horizontal surface of the cam 134 are introduced from the inlet of the groove 134a of the cam 134, and is disposed on the lower horizontal surface of the cam 134 from the outlet via the groove 134a. Accordingly, the bins 112A, 112B disposed downwardly are urged against the tension force of the tension spring 145 downwardly by the lowered bin 112C. Thus, the gap between the bins 112C and 112B becomes substantially equal to the size of the diameter of the sliders 124a, 124b mounted at the bins 112B and 112C, respectively, and is disposed lower than the sheet conveying surface Y.

Figure 26C:
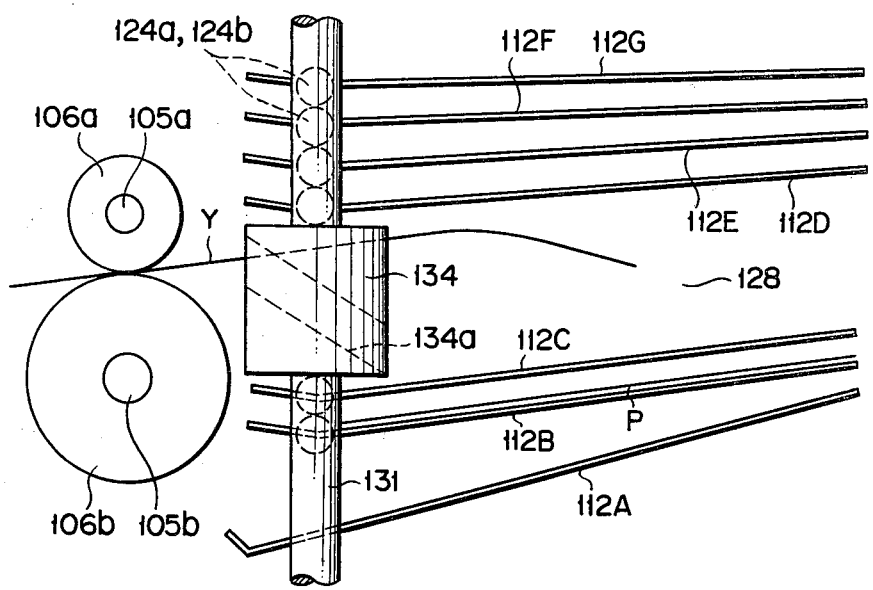

When the bin 112C is moved onto the lower horizontal surface of the cam 134, the sliders 124a, 124b of the bin 112D are contacted with the upper horizontal position of the cam 134 by the compression force of the compression spring 142. Accordingly, the bin 112D moving upwardly will expand the space between the bins 112C and 112D to form the wide sheet containing section 128. When the notch 146a of the disc 146 mounted on the shaft 131 is detected by the detector 147, the motor 140 is stopped in rotation by the signal from the detector. The sheet P is exhausted via the rollers 22, as shown in FIG. 26C, into the sorter unit D at this stage. The sheet P thus introduced into the sorter unit D, is contained via the rollers 106a, 106b into the sheet containing section 128 between the bins 112C and 112D.

The sorting operation is sequentially repeated in this order. The final copying operation of the first original, e.g., the fourth copying operation of the original is finished, and the sheets P are contained in the sheet containing section 128 between the bins 112E and 112F for the copy sheet of the fourth copy of the initial original. Even if the rear end of the sheet P is detected by the detector at this time, the copy end signal from the copying machine A is inputted to the sorting control circuit. Accordingly, the motor 140 is not rotated, but is maintained as it is.

Figure 26D:
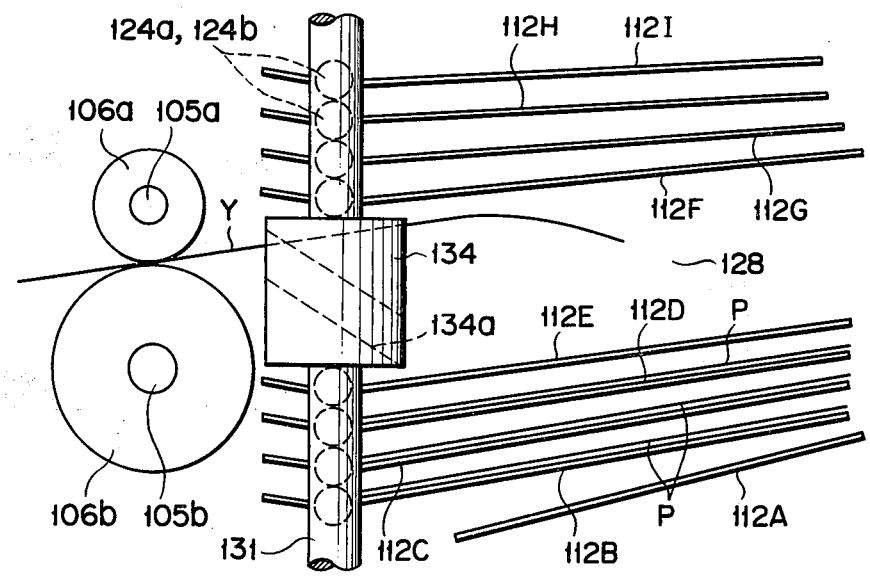

Then, the first original of the original placing unit 5 is removed, and the second original is placed on the copying position M. Thus, the second original is started in copying operation. The fixed and exhausted sheet P via the rollers 22 is introduced into the sorter unit D. The sheet P thus introduced into the sorter unit D is, as shown in FIG. 26D, contained in the sheet containing section 128 between the bins 112E and 112F via the rollers 106a, 106b. At this time, a detector (not shown) disposed at the position adjacent to the rollers 22 will detect the rear end of the sheet P. The detection signal from the detector is outputted into the sorting control circuit to reversely rotate the motor 140. The reverse rotation of the motor 140 is transmitted through the sprocket 137, the idle gear 139 and the endless chain 138 into a pair of sprockets 136 to reversely rotate them. The shaft 131 is reversely rotated by the reverse rotation of the sprocket 136, and the cam 134 of the shaft 131 is simultaneously rotated. Thus, the sliders 124a, 124b of the bin 112E disposed on the lower horizontal surface of the cam 134 are introduced through the inlet (lower) of the groove 134a of the cam 134, and is disposed on the upper horizontal position from the outlet (upper) via the groove 134a. In this manner, the bin 112F disposed upwardly is urged against the compression force of the compression spring 142 upwardly by the raised bin 112E. Accordingly, the gap between the bins 112E and 112F becomes substantially equal to the size of the sliders 124a, 124b mounted at the bins 112E and 112F, respectively, and is disposed upper than the sheet conveying surface Y.

When the bin 112E is moved above the horizontal surface of the cam 134, the sliders 124a, 124b of the bin 112D are contacted simultaneously with the lower horizontal surface of the cam 134 downwardly. Thus, the gap between the bins 112E and 112D is expanded to form the wide sheet containing section 128. When the notch 146a of the disc 146 is detected by the detector 147 at the shaft 131, the motor 140 is stopped by the signal from the detector. At this stage, the second copy sheet P for the second original is exhausted through the rollers 22, and is introduced into the sorter unit D. The copy sheet P thus introduced into the sorter unit D is contained in the sheet containing section 128 between the bins 112D and 112E via the rollers 106a, 106b.

The sorting operation is successively repeated in this sequence. The copying operation of the final number of sheets for the second original is thus finished, and the sheet is contained in the sheet containing section 128 between the bins 112B and 112C. Subsequently, the sorting operation of the third original is carried out in the same manner as the copying operation for the first original.

After all the originals are thus copied completely, the motor 140 is driven by the signal from the copying machine A, when the operator again presses the sorting mode setting button or the state that the button is not pressed is continued for a predetermined period. Thus, the bins 112 for the sorting are raised by the cam 134. When all the sorting bins 112 are raised, the actuators (not shown) of the sliders 124a, 124b are operated to open the switch (not shown), e.g., a photointerrupter or the like and to stop the motor 140. That is, the sorter unit D is returned to the non-sorting mode. When the actuators of the sliders 124a, 124b thus open the switch, the motor 140 is reversely rotated to raise the bins 112 for sorting upwardly.

When four copies of the originals of predetermined number are completely copied, the intermediate parts of the bins 112 are raised as shown in FIG. 27, and the sheets P contained in the sheet containing section between the adjacent bins 112 are sequentially extracted.

It is noted that the foregoing description is directed only to mere one embodiment by way of an illustration and this embodiment can also be substituted for other device, unit and members which incorporate the same functions as the respective devices, units and members described previously within the spirits and the scope of the present invention.

Although the foregoing description is directed to the embodiment in which the electrostatic copying machine is used for the image forming device A, the present invention is not limited only to this embodiment, but can perform the similar effects even by employing an electronic printer, a fascimile equipment or an image information storage and retrieval apparatus having the similar mechanisms to the aforementioned mechanisms.

It is also noted that the foregoing description is directed to the feeder unit B which is movable with the truck 37, but a feeder unit placing section may be provided on the platform C and may be detachably disposed on the platform. The placing section of this case can be rotatably mounted at one side of the platform C and is constructed to become substantially horizontal at the time of using, thereby simplifying the construction at the time of not using for convenient stock and transportation and the like.

It is also appreciated that the foregoing description is directed to the sorter unit D in which the sheets in the non-sorting mode are contained in the bin 42A of the lowermost stage, the sheet for the first original is contained from below to upwardly in the sorting mode and the sheet for the second original is contained from above to downwardly, but the sorter unit D may not be limited only to this. For instance, the sorter unit D may be so constructed that the bins 112 is disposed at the uppermost position in the non-sorting mode to contain the sheets and the sheets for the first original are sequentially contained one by one from above to downwardly even in the sorting mode. In this case, a transparent part is formed at least at the upper surface cover of the sorter unit D and the bin of the uppermost stage to contain the sheets to be contained and to confirm the copying degree of the sheets in the state that the sheets are contained.

It is understood that the foregoing description is directed to the sorter unit D in which the sheet containing sections are separately constructed in the sorting mode and in the non-sorting mode, but the sorter unit D may not be limited only to this, but the sheet containing section for the non-sorting mode can be used also as the initial sheet containing section in the sorting mode.

Further, the controlling member 158 of the original feeding unit E may not be limited only to one, but may also be provided in plural number as required. Moreover, the containing member for the sorter unit D may be detachably and may also be horizontally rotatably provided. Thus, when clogging of the sheet occurs, the containing member can be horizontally rotated to rapidly remove the clogged sheet from the conveying direction of the sheet. In addition, the sheets may not be retained in the system in the state partly broken. Furthermore, when the containing member is unnecessary, it can be removed to simplify the construction convenient for the stock and transportation. When the intermediate between the bins is deflected to expand the gap between the bins, thereby readily removing the sheets contained and conveniently operating the device.

It is appreciated from the foregoing description that since the original feeding unit is thus constructed, it can prevent the original from floating or jumping up, thereby preventing the original from being irregularly arrange in the original retainer and rapidly aligning the originals.

It is understood that since the image forming system of the present invention is thus constructed, it has unidirectional confirming position, which in turn facilitates the confirmation with excellent operability. In addition, since the construction of the present invention is remarkably simple, it has high reliability inexpensively.

What we claim is:

1. An image forming system comprising:
   a platform placed on a floor;
   an image forming device having a first body mounted on said paltform and an exposure unit provided on the upside of the first body for exposing an original placed thereon;
   sheet feeding means provided at one side of the first body and including a cassette which receives a small number of copying papers of one size therein and is detachably attached to a middle part of said one side of the first body and a feeder placed on the floor which receives a large number of copying papers with another size therein and is detachably attached to a lower part of said one side of the first body;
   sheet exhausting means provided at an upper part of said one side of the first body;
   said image forming device for copying an image corresponding to the original on a copy sheet fed from said sheet feeding means and for exhausting the copied sheet from said sheet exhausting means; and
   an original feeding device having a second body arranged on the exposure unit, an original inserting means provided at one side of the second body in the same side of the one side of the first body and inserted with the original thereto, an original exhausting means provided at said one side of the second body and exhausted with the copied original and a conveying mechanism for conveying the inserted original to the exposure unit and conveying the original exposed thereat to the original exhaust means.

2. The image forming system according to claim 1, wherein said original feeding device comprises an original inserting section disposed above the original exhausting means, and the original is inserted into the original inserting section with the surface to be copied upside.

3. The image forming system according to claim 1, wherein said sheet feeding means comprises the first and the second sheet feeders provided adjacently elevationally to one another at one side of the first body.

4. The image forming system according to claim 3, which further comprises:
   a sheet feeding cassette detachably mounted on said first sheet feeder for containing a plurality of sheets; and
   feeder means detachably mounted on said second feeder for containing a plurality of sheets, wherein said image forming device is supplied selectively with the sheet from any of the sheet feeding cassette and the feeder means.

5. The image forming system according to claim 1, wherein said sheet exhausting means comprises a sheet exhausting port formed at the first body.

6. The image forming system according to claim 5, which further comprises:
   a sorter means detachably mounted at the exhaust port.

7. The image forming system according to claim 6, wherein said sorter means comprises a plurality of sheet containing sections for containing a plurality of copied sheets.

8. The image forming system according to claim 7, wherein said each sheet containing section is defined by the space of a pair of bins contacting elevationally adjacently to one another.

9. An image forming system comprising:
   a platform placed on a floor;
   an image forming means having a first body mounted on said platform and an exposure unit provided on the topside of the first body for exposing an original placed thereon;
   sheet feeding means provided at one side of the first body and including a cassette which receives a small number of copying papers of one size therein and is detachably attached to a middle part of said one side of the first body and a feeder placed on the floor which receives a large number of copying papers with another size therein and is detachably attached to a lower part of said one side of the first body;
   sheet exhausting means provided at an upper part of said one side of the first body;
   said image forming means for copying an image corresponding to the original on a copy sheet fed from said sheet feeding means and exhausting the copied sheet to said sheet exhausting means; and
   original feeding means having a second body arranged on the exposure unit, an original inserting means provided at one side of the second body in the same side of the one side of the first body and inserted with the original thereto, an original exhausting means provided at said one side of the second body and exhausted with the copied original, and a conveying means for conveying the inserted original to the exposure and for conveying the original exposed thereat to the original exhausting means, and wherein
   said feeder includes:
   (a) paper support means reciprocally vertically moveable between upper and lower positions for supporting a stack having a large number of copying papers therein;
   (b) a feeding platform for accepting a sheet of copying paper transferred from said stack thereof and including conveying means for conveying said sheet to said image forming means;
   (c) transfer means for transferring said sheets of copying paper on a sheet by sheet basis from said stack to said feeding platform;
   (d) means associated with said transfer means for permitting vertical movement of said transfer means between a high limit position and a low limit position to compensate for removal of copying papers from said stack to thereby ensure engagement of said transfer means with the uppermost sheet of copying paper in said stack; and
   (e) means operatively connected to said means sub (d) and said feeding platform for detecting said high and low limit positions and for raising said platform from said low limit position, when detected, to said high level position to maintain a predetermined sheet feeding range therebetween.

10. A system as in claim 9 wherein said means sub (e) includes:
   (i) reversible motor means operatively coupled to said paper support means for moving said paper support means between said upper and lower positions; and
   (ii) switch means operatively coupled to said motor means for detecting said high and low limit positions and for operating said motor means when said low limit position is detected to responsively upwardly move said paper support platform and for stopping said motor means when said high limit position is detected.

11. A paper feeding unit for supplying copying paper on a sheet by sheet basis to a copying machine, said unit comprising:
   housing means defining an interior space for accepting a stack of copying papers therein and defining a discharge opening for permitting a sheet of said stack of copying papers to be discharged from said stack;
   a feeding platform fixed to said housing means and operatively associated with said discharge opening for accepting a sheet of said copying papers discharged through said discharge opening and including means for conveying said sheet to said copying machine;
   a support platform including first mounting means for mounting said support platform in said interior space to permit vertical reciprocal movement of said platform between upper and lower positions;
   transfer means for transferring said sheets of copying paper on a sheet by sheet basis from said stack to said feeding platform and including second mounting means permitting vertical movement of said transfer means between high and low limit positions to establish a predetermined sheet feeding range;
   means permitting vertical movement of said support platform between upper and lower positions and including reversible motor means operatively connected to said support platform and rotatable in a first direction to responsively raise said platform and in a second direction to responsively lower said platform; and
   means operatively interconnecting said second mounting means and said means permitting vertical movement of said support platform for detecting said high and low limit positions and for responsively operating said motor means in said first direction to raise said support platform and to stop operation of said motor means in said support platform and to stop operation of said motor means in response to detection of said high limit position to maintain the uppermost sheet of said copying papers in said stack within said predetermined feeding range.

12. A unit as in claim 10 further comprising:
   door means associated with said housing means and operable between a closed position and an open position wherein access to said interior space is permitted; and
   first switch means operatively associated with said door means for detecting when said door means is in said open position; and
   second switch means for detecting when said support platform is in said lower position, and wherein,
   said first switch means operates said motor means in said second direction to responsively lower said support platform when said door means is in said open position, and wherein, said second switch means stops said motor means from rotating in said second direction when said support platform is in said lower position.

* * * * *